US009687793B2

(12) United States Patent
Hariyama et al.

(10) Patent No.: US 9,687,793 B2
(45) Date of Patent: Jun. 27, 2017

(54) ORGANIC POLYMER THIN MEMBRANE, AND METHOD FOR PRODUCING SAME

(71) Applicant: JAPAN SCIENCE AND TECHNOLOGY AGENCY, Saitama (JP)

(72) Inventors: Takahiko Hariyama, Shizuoka (JP); Yasuharu Takaku, Shizuoka (JP); Hiroshi Suzuki, Shizuoka (JP); Masatsugu Shimomura, Hokkaido (JP); Daisuke Ishii, Aichi (JP); Isao Ohta, Shizuoka (JP); Yoshinori Muranaka, Shizuoka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 14/426,508

(22) PCT Filed: Sep. 6, 2013

(86) PCT No.: PCT/JP2013/074141
§ 371 (c)(1),
(2) Date: Mar. 6, 2015

(87) PCT Pub. No.: WO2014/038674
PCT Pub. Date: Mar. 13, 2014

(65) Prior Publication Data
US 2015/0224452 A1    Aug. 13, 2015

(30) Foreign Application Priority Data

Sep. 7, 2012  (JP) ................................ 2012-197927
Apr. 12, 2013 (JP) ................................ 2013-084400

(51) Int. Cl.
B01D 69/12    (2006.01)
B01D 71/38    (2006.01)
(Continued)

(52) U.S. Cl.
CPC ........... B01D 71/38 (2013.01); B01D 67/009 (2013.01); B01D 69/02 (2013.01); B01D 69/127 (2013.01);
(Continued)

(58) Field of Classification Search
None
See application file for complete search history.

(56) References Cited

U.S. PATENT DOCUMENTS 4,046,843 A * 9/1977 Sano .................... B01D 67/009
                                                    210/500.23
4,623,594 A   11/1986 Keough
(Continued)

FOREIGN PATENT DOCUMENTS

JP    60-001233    1/1985
JP    60-221414    11/1985
(Continued)

OTHER PUBLICATIONS

Takaku et al. (PNAS, May 7, 2013, vol. 110, No. 19, 7631-7635).*
International Search Report issued Nov. 26, 2013 in International (PCT) Application No. PCT/JP2013/074141.

Primary Examiner — Vu A Nguyen
(74) Attorney, Agent, or Firm — Wenderoth, Lind & Ponack, L.L.P.

(57) ABSTRACT

Provided is a technique for fabricating a novel thin membrane with a starting material such as a biocompatible compound that is not easily processible into a membrane, particularly a technique for fabricating a novel thin membrane of a composition that is gradually polymerized from a (Continued)

membrane surface into the membrane in the cross sectional direction of the membrane, and having, for example, different structures on the front and back of the membrane. The technique includes the steps of preparing a solution of a starting material compound; forming a thin membrane of the solution on a base material surface; and forming the organic polymer thin membrane through a polymerization reaction caused by irradiating the exposed surface of the thin membrane with a plasma or an electron beam.

8 Claims, 31 Drawing Sheets

(51) Int. Cl.
    *C09D 4/00*     (2006.01)
    *C09D 4/06*     (2006.01)
    *B01D 67/00*     (2006.01)
    *B01D 69/02*     (2006.01)

(52) U.S. Cl.
    CPC ................. *C09D 4/00* (2013.01); *C09D 4/06* (2013.01); *B01D 2323/30* (2013.01); *B01D 2325/36* (2013.01)

(56) References Cited

U.S. PATENT DOCUMENTS

| | | |
|---|---|---|
| 5,223,553 A | 6/1993 | Keough |
| 2003/0210302 A1* | 11/2003 | Keefe ................. B41J 2/14016 347/63 |
| 2011/0105631 A1* | 5/2011 | Wright ................. C08J 5/2262 521/27 |
| 2013/0171619 A1* | 7/2013 | Li ............................. B32B 3/26 435/5 |

FOREIGN PATENT DOCUMENTS

| | | |
|---|---|---|
| JP | 61-23621 | 2/1986 |
| JP | 2002-145971 | 5/2002 |
| JP | 2012-184291 | 9/2012 |
| JP | 2013-177542 | 9/2013 |

* cited by examiner

Fig. 4
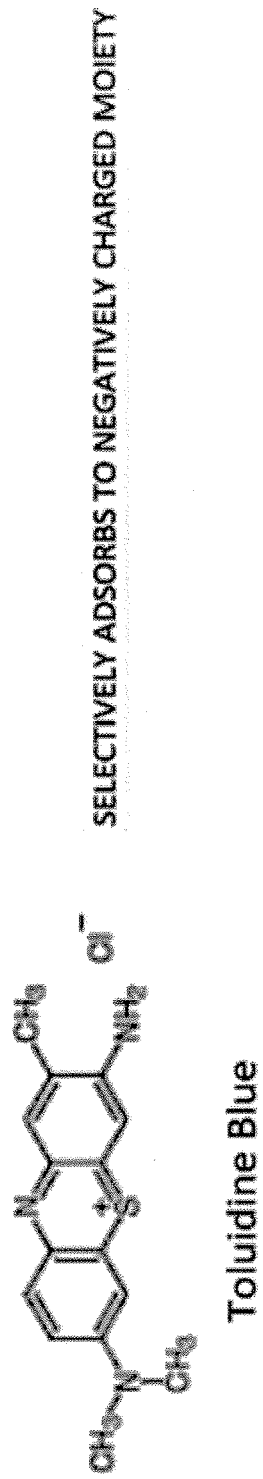
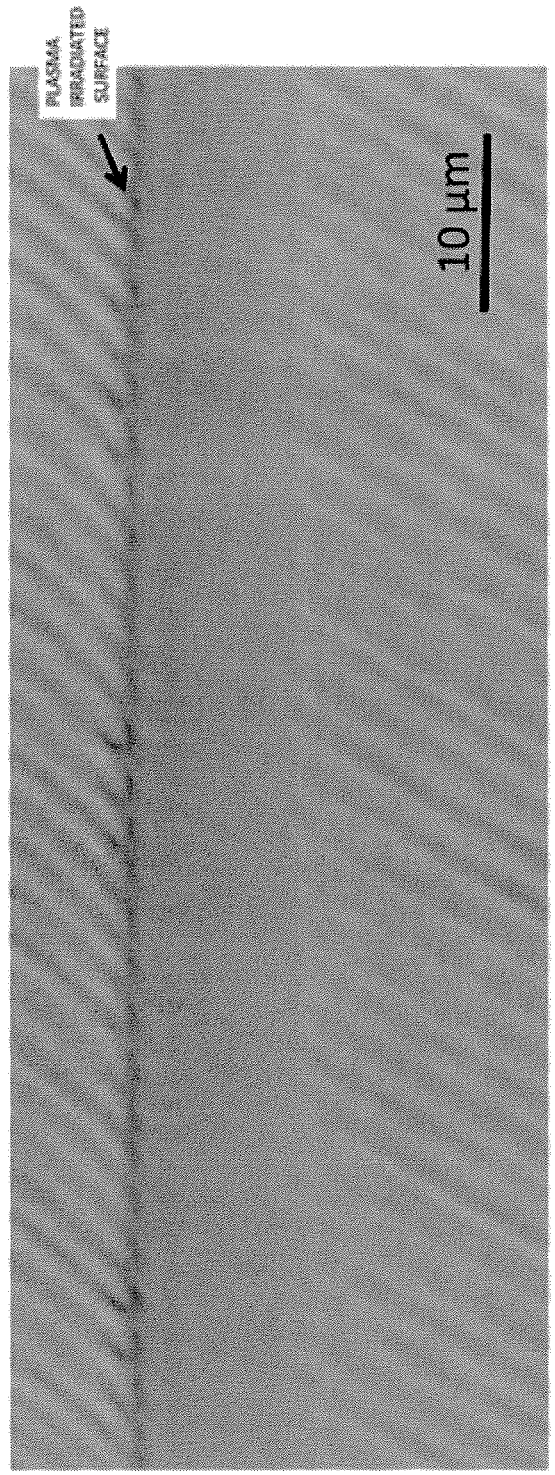

Fig. 13
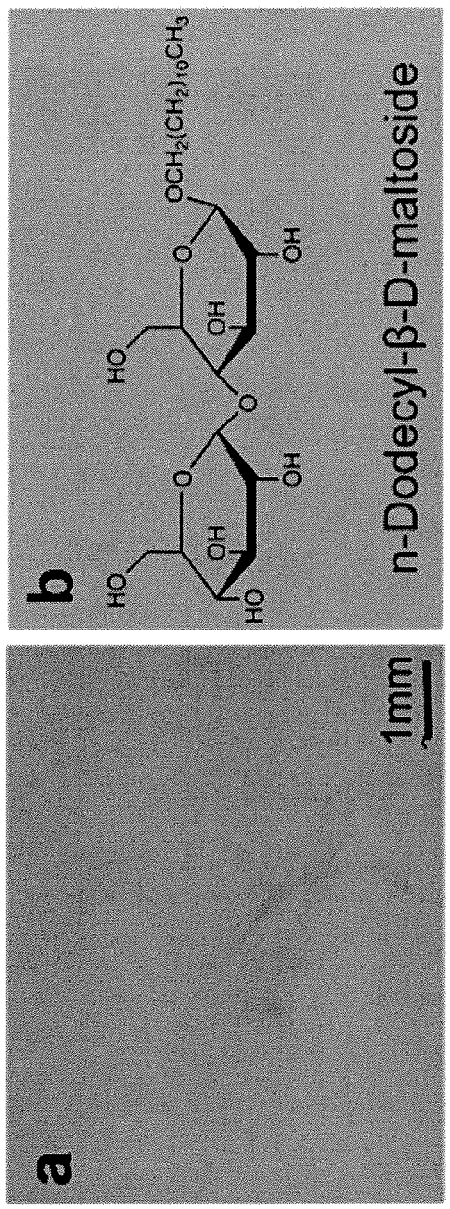
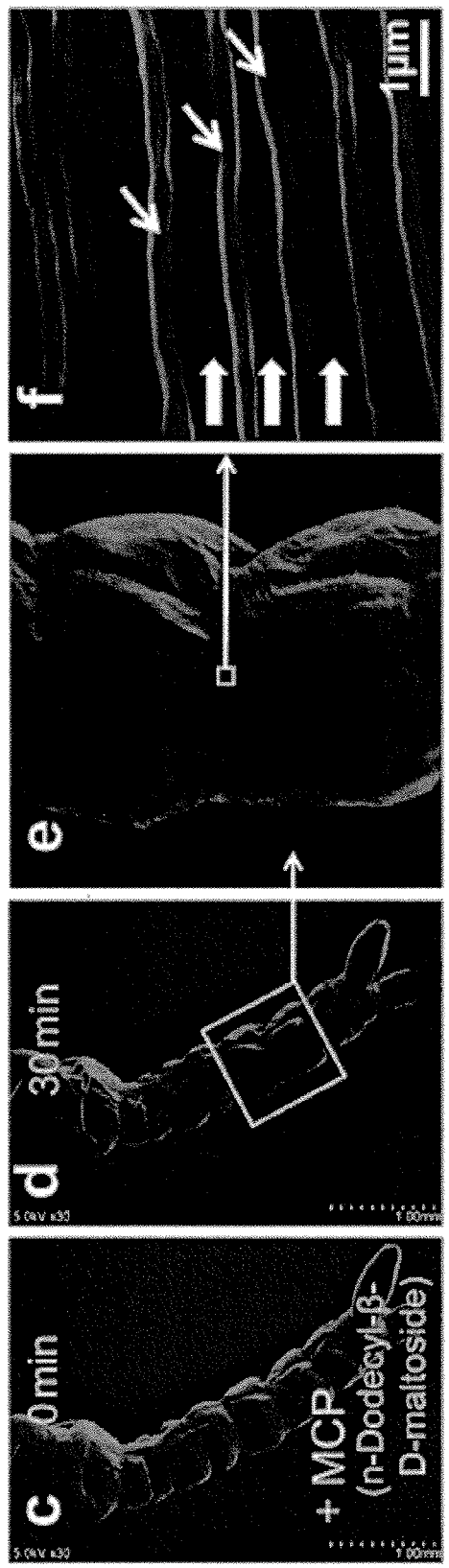

Fig. 16
(b)
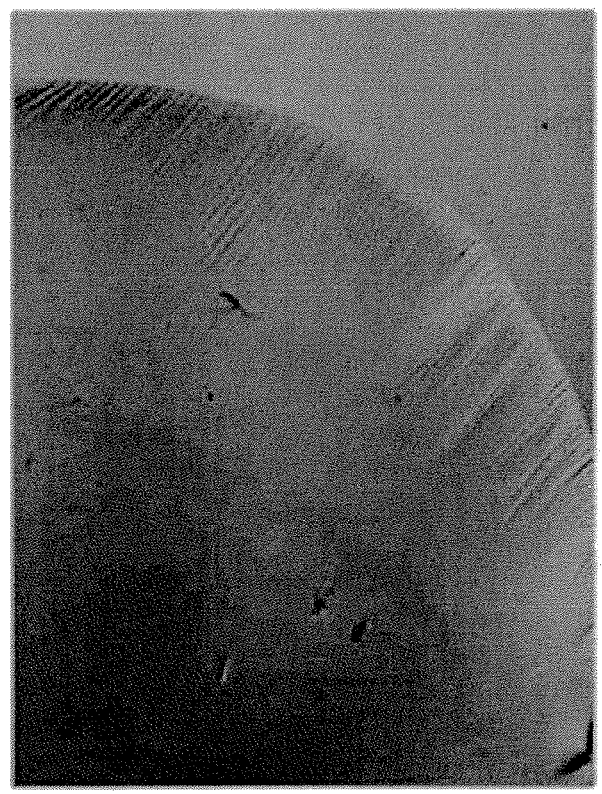
(a)

Fig. 30
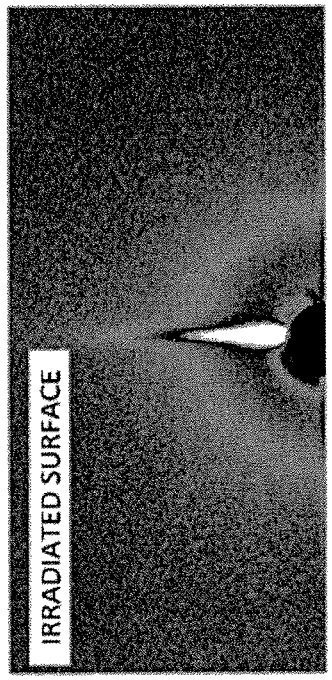
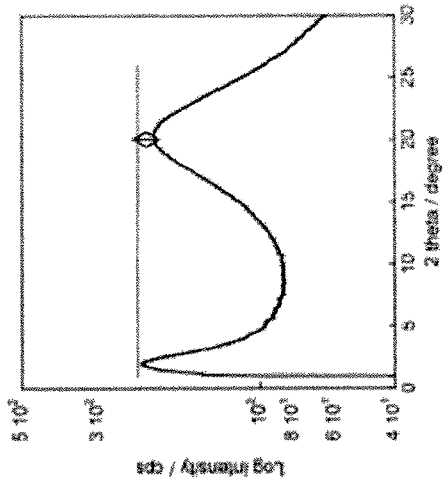
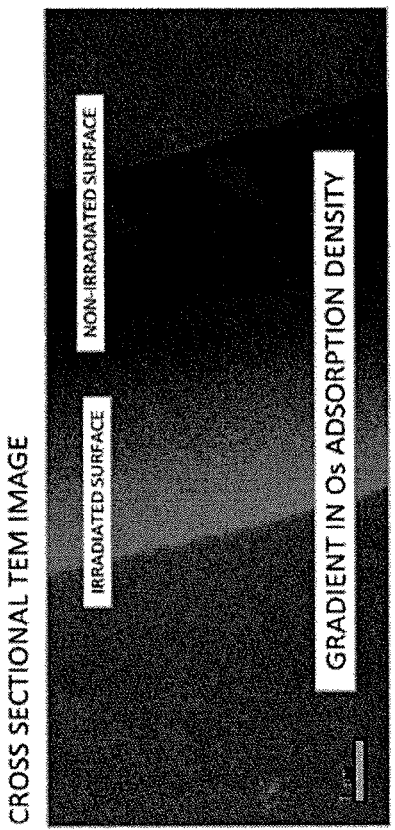

ORGANIC POLYMER THIN MEMBRANE, AND METHOD FOR PRODUCING SAME

TECHNICAL FIELD

The present invention relates to an organic polymer thin membrane, and a method for producing same.

BACKGROUND ART

Among the examples of previously reported water-soluble compound membranes having different structures on the front and back are laminates of langmuir membranes (LB membranes) with a hydrophobic functional group and a hydrophilic functional group arranged at the gas-solid interface and the solid-liquid interface, respectively, and alternate laminate membranes of a cationic polymer and an anionic polymer.

However, fabrication of a self-supporting membrane for functional membrane applications requires laminating LB membranes or alternate laminate membranes of a molecular length thickness in several hundred layers. This is time consuming and costly.

There is a method in which a thin membrane prepared by using an existing technique such as spin casting is crosslinked to become insoluble to water. However, this requires restricting the starting material compounds, or mixing different compounds. It is also difficult to form a self-supporting membrane having different front and back structures because the whole membrane is crosslinked to become insoluble to water.

A plasma process by plasma or electron beam irradiation has been known for many years since it was first reported some 140 years ago (Non Patent Literatures 1 and 2), and plasma irradiation is commonly used in applications such as deposition from a gas phase using intermolecular radical polymerization, a surface hydrophilic treatment, and crosslinking of polymers. For example, Patent Literature 1 describes performing plasma gas phase deposition by heating polysaccharides or methyl silicon resins to evaporate, and introducing the gas onto a substrate with an inert gas or other materials.

CITATION LIST

Patent Literature

Patent Literature 1: JP-A-7-256088

Non Patent Literature

Non Patent Literature 1: Ber. Dtsch. Chem. Ges., 7, 352 (1874)
Non Patent Literature 2: Compt. Rend., 78, 219 (1874)

SUMMARY OF INVENTION

Technical Problem

The present invention has been made under these circumstances, and it is an object of the present invention to provide a technique for fabricating a novel thin membrane with a starting material such as a biocompatible compound that is not easily processible into a membrane, particularly a technique for fabricating a novel thin membrane of a composition that is gradually polymerized from a membrane surface into the membrane in the cross sectional direction of the membrane, and having, for example, different structures on the front and back of the membrane.

Solution to Problem

As a solution to the foregoing problems, an organic polymer thin membrane producing method of the present invention includes the steps of:
preparing a solution of a starting material compound;
forming a thin membrane of the solution on a base material surface; and
forming the organic polymer thin membrane through a polymerization reaction caused by irradiating the exposed surface of the thin membrane with a plasma or an electron beam.

The method may further include the step of forming a self-supporting membrane by detaching the organic polymer thin membrane from the base material.

It is preferable in the organic polymer thin membrane producing method that the organic polymer thin membrane formed through a polymerization reaction caused by irradiating the exposed surface of the thin membrane with a plasma or an electron beam has a composition that is gradually polymerized from a thin membrane surface into the membrane in a cross sectional direction of the membrane.

In the organic polymer thin membrane producing method, the gradually polymerized composition may be confirmed by using at least one selected from:
transmission electron microscopy of a cross section across the thin membrane from the irradiated surface to the non-irradiated surface after osmium staining of the thin membrane;
energy dispersive X-ray inner composition analysis of the thin membrane from the irradiated surface to the non-irradiated surface;
atomic force microscopy of surface structures on both surfaces of the thin membrane; and
glazing-incidence small angle X-ray scattering orientation analysis of both thin membrane surfaces.

In the organic polymer thin membrane producing method, the starting material compound may be a compound having a hydrophilic functional group. In this case, the starting material compound may be a compound that has a polyalkylene glycol chain within the molecule, or a compound having a functional group selected from a hydroxyl group and a carboxyl group.

In the organic polymer thin membrane producing method, the starting material compound may be a compound having a polymerization active group. In this case, the starting material compound may be a compound having at least one selected from a carbon-carbon double bond, a carbon-nitrogen double bond, and a carbon-oxygen double bond.

The present invention also provides an organic polymer thin membrane that comprises an organic polymer and having a composition that is gradually polymerized from a thin membrane surface into the membrane in a cross sectional direction of the membrane. In the organic polymer thin membrane, for example, the gradually polymerized composition reflects a polymerization reaction profile that occurs in a direction from the irradiated surface to the non-irradiated surface during formation of the organic polymer thin membrane in a polymerization reaction caused by irradiating one surface of the thin membrane with a plasma or an electron beam. The gradually polymerized composition may be confirmed by using at least one selected from:

transmission electron microscopy of a cross section across the thin membrane from the irradiated surface to the non-irradiated surface after osmium staining of the thin membrane;

energy dispersive X-ray inner composition analysis of the thin membrane from the irradiated surface to the non-irradiated surface;

atomic force microscopy of surface structures on both surfaces of the thin membrane; and glazing-incidence small angle X-ray scattering orientation analysis of both thin membrane surfaces.

In the organic polymer thin membrane, a starting material compound of the organic polymer may be a compound having a hydrophilic functional group. In this case, the starting material compound may be a compound having a polyalkylene glycol chain within the molecule, or a compound having a functional group selected from a hydroxyl group and a carboxyl group.

In the organic polymer thin membrane, the starting material compound of the organic polymer may be a compound having a polymerization active group. In this case, the starting material compound may be a compound having at least one selected from a carbon-carbon double bond, a carbon-nitrogen double bond, and a carbon-oxygen double bond.

The organic polymer thin membrane may be a self-supporting membrane.

Advantageous Effects of Invention

The present invention can provide a novel thin membrane fabricated from a starting material such as a biocompatible compound that is not easily processible into a membrane, particularly a thin membrane of a composition that is gradually polymerized from a membrane surface into the membrane in the cross sectional direction of the membrane, and having, for example, different structures on the front and back of the membrane.

BRIEF DESCRIPTION OF DRAWINGS

FIG. 4 shows a light micrograph of a cross section of the thin membrane of Example 1 stained with toluidine blue.

FIG. 13 shows photographic images of the polymer membrane of Example 9 and SEM video images of the polymer membrane on a sample surface.

FIG. 16 shows (a) a light micrograph of a self-supporting polymer membrane of Example 12 after plasma irradiation, and (b) a light micrograph of the polymer membrane being detached in ethanol.

FIG. 30 shows the result of the GI-SAXS thin membrane orientation analysis of the polymer membrane of Example 20 (starting material: Tween 60), and the cross sectional TEM image of the polymer membrane.

DESCRIPTION OF EMBODIMENTS

Figure 1:
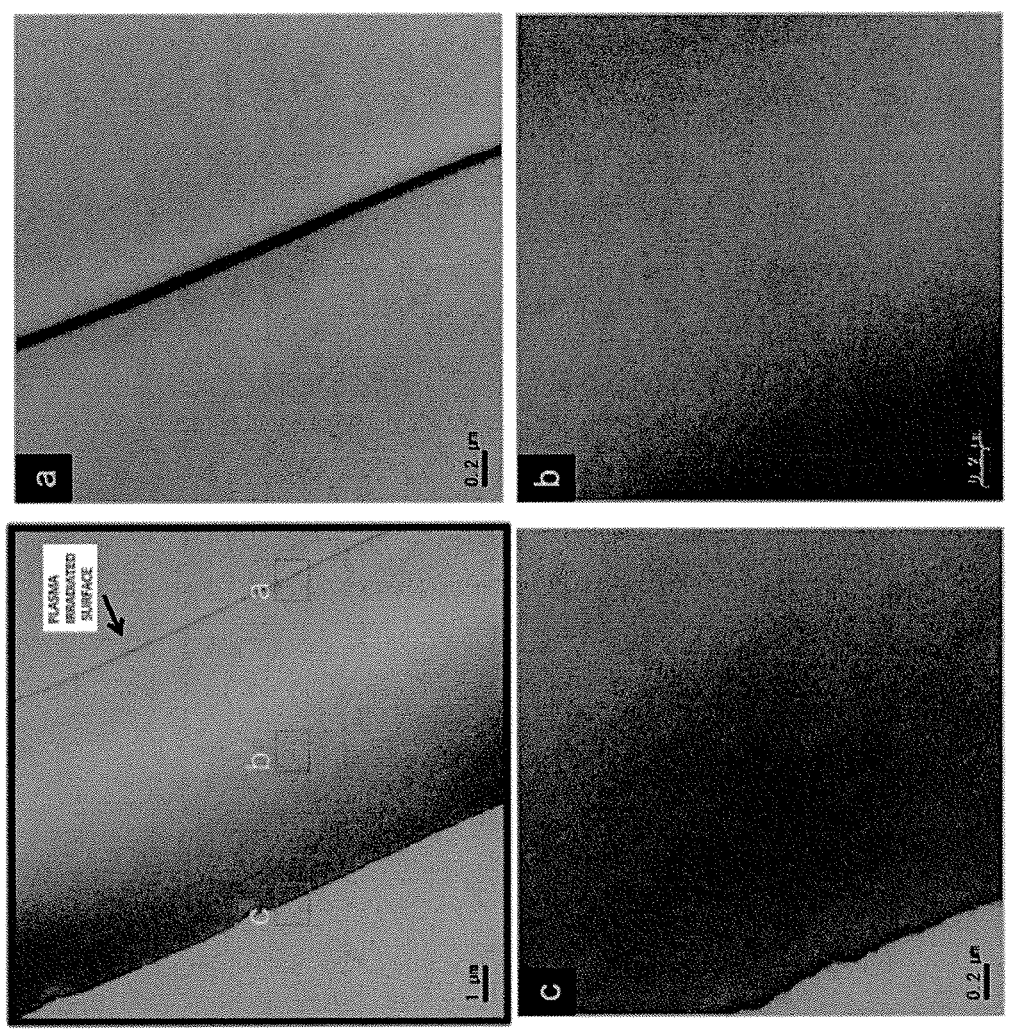
FIG. 1 shows TEM images of a thin membrane obtained in Example 1, in which a, b, and c are magnified views of the portions a, b, and c in the upper left picture of the figure.

The present invention is described below in detail.

The starting material compound used in the organic polymer thin membrane producing method of the present invention may be any of various biocompatible compounds and other materials, as exemplified below.

The starting material compound may be a compound with a hydrophilic functional group. Examples of such starting material compounds include compounds having a polyalkylene glycol chain within the molecule, and compounds having a functional group selected from a hydroxyl group and a carboxyl group.

The molecular weights of compounds having a hydrophilic functional group are not particularly limited. For example, $C_4$ to $C_{100}$ organic compounds, particularly $C_6$ to $C_{50}$ organic compounds are considered.

The starting material compound may be a compound that does not have a polymerization active group. For example, a compound having a hydrophilic functional group such as above may be used to form the organic polymer thin membrane through the polymerization reaction of the hydrophilic functional group.

The starting material compound may be a compound with a polymerization active group. Examples of such starting material compounds include compounds having at least one selected from a carbon-carbon double bond, a carbon-nitrogen double bond, and a carbon-oxygen double bond.

The molecular weights of compounds having a polymerization active group are not particularly limited. For example, $C_4$ to $C_{100}$ organic compounds, particularly $C_6$ to $C_{50}$ organic compounds are considered.

The starting material compound used in the organic polymer thin membrane producing method of the present invention may be any of various biocompatible compounds and other materials, as noted above. A strong polymer membrane suited as a self-supporting membrane can be obtained in one-pot with a monomer that preferably satisfies one of the conditions that the hydrocarbon has a cyclic structure (e.g., a sugar backbone, and a steroid backbone), or an aromatic monocyclic ring or an aromatic fused ring (e.g., polycyclic aromatic hydrocarbon, and a heterocyclic compound), and a water-soluble moiety (e.g., fatty acid, and a PEG chain) on a side chain. Monomers satisfying such a condition can be used to obtain a self-supporting membrane.

Examples of the starting material compound include surfactants, sugars, fatty acids, fatty acid esters, metal alkoxides, and hydrocarbon compounds having an allyl group.

(Surfactants)

Surfactants tend to produce a desirable polymer membrane. The polymer membrane can be obtained from artificial compounds, and naturally occurring surfactants such as saponins, phospholipids, and peptides.

For example, desirable deposition has been confirmed from materials such as saponins, soybean lecithin, lysine, poly L-lysine, and tannic acid.

Surfactants of artificial compound origin that have had a linear alkyl group introduced into the sugar can be used to produce the polymer membrane. However, disaccharides are more likely to produce a stable polymer membrane than monosaccharides.

Surfactants are broadly classified into anionic surfactants, cationic surfactants, non-ionic surfactants, zwitterionic surfactants, and naturally occurring surfactants by their molecular structures, and are used in a wide range of fields such as in industrial, food, and medical products. Any of these surfactants can basically be used to obtain the polymer membrane.

Among the above-mentioned surfactants, anionic surfactants are classified into the categories of, for example, carboxylate, sulfate ester, sulfonate, and phosphate ester types. Specific examples include sodium dodecyl sulfate, sodium laurate, α-sulfo fatty acid methyl ester sodium salt, sodium dodecylethoxylate sulfate, and sodium dodecylethoxylate sulfate. Preferred for use is sodium dodecylbenzenesulfonate.

Among the above-mentioned surfactants, cationic surfactants are classified into the categories of, for example, quaternary ammonium salt, alkylamine, and heterocyclic amine types. Specific examples include stearyltrimethylammonium chloride, distearyldimethylammonium chloride, didecyldimethylammonium chloride, cetyltripyridinium chloride, and dodecyldimethylbenzylammonium chloride.

Among the above-mentioned surfactants, examples of the non-ionic surfactants include polyoxyethylene alkyl ether, polyoxyethylene hydrogenated castor oil, polyoxyethylene monofatty acid ester, polyoxyethylene sorbitan monofatty acid ester, sucrose fatty acid ester, polyglycerin fatty acid ester, alkyl polyglycoside, and N-methylalkyl glucoamide. Preferred examples include dodecyl alcohol ethoxylate, nonyl phenol ethoxylate, lauroyl diethanolamide, and commercially available products sold under the names Triton™ X (e.g., Triton™ X-100), Pluronic® (e.g., Pluronic® F-123, and F-68), Tween (e.g., Tween 20, 40, 60, 65, 80, 85), Brir® (e.g., Brij® 35, 58, 98), and Span (Span 20, 40, 60, 80, 83, 85).

Among the above-mentioned surfactants, examples of the ampholytic surfactants include lauryldimethylaminoacetate betaine, dodecylaminomethyldimethylsulfopropyl betaine, and 3-(tetradecyldimethylaminio)propane-1-sulfonate. Preferred examples include 3-[(3-cholamidopropyl)dimethylammonio]-1-propanesulfonate (CHAPS), and 3-[(3-cholamidopropyl)dimethylammonio]-2-hydroxy-1-propanesulfonate (CHAPSO).

Among the above-mentioned surfactants, preferred examples of the naturally occurring surfactants include lecithins, and saponins. Specifically, preferred examples of compounds available under the name lecithin include phosphatidyl choline, phosphatidyl ethanolamine, phosphatidyl inositol, phosphatidyl serine, phosphatidic acid, and phosphatidyl glycerol. Preferred as the saponin is quillaja saponin.

Among the above-mentioned surfactants, preferred examples of amphiphatic compounds of microorganism origin (biosurfactants) include rhamnolipids, sophorolipids, and mannosyl-erythritol lipids.

Examples of other known common surfactants, particularly those used for cosmetics include almond oil PEG-6, acyl(C12,14) sodium aspartate, acyl(C12,14) TEA aspartate, arachideth-20, stearyl alcohol, alkyl(C11,13,15) sodium sulfate, alkyl(C11,13,15) TEA sulfate, alkyl(C11,13,15) potassium phosphate, alkyl(C12,13) DEA sulfate, alkyl(C12,13) sodium sulfate, alkyl(C12,13) TEA sulfate, alkyl(C12,14, 16) ammonium sulfate, alkyl(C12-14) oxyhydroxypropylarginine hydrochloride, alkyl(C12-14) diaminoethylglycine hydrochloride, alkyl(C12-14) TEA sulfate, alkyl(C12-15) TEA sulfate, alkyl(C14-18) sodium sulfonate, alkyl(C16,18) trimonium chloride, alkyl(C28) trimonium chloride, isostearamido DEA, isostearyl alcohol, isostearyl glyceryl ether, isostearyl lauryl dimonium chloride, PEG-2 isostearate, PEG-3 isostearate, PEG-4 isostearate, PEG-6 isostearate, PEG-8 isostearate, PEG-10 isostearate, PEG-12 isostearate, PEG-15 glyceryl isostearate, PEG-20 isostearate, PEG-20 glyceryl isostearate, PEG-20 isostearate hydrogenated castor oil, PEG-20 sorbitan isostearate, PEG-30 isostearate, PEG-30 glyceryl isostearate, PEG-40 isostearate, PEG-50 isostearate hydrogenated castor oil, PEG-58 isostearate hydrogenated castor oil, PEG-60 glyceryl isostearate, PG isostearate, sorbitan isostearate, sorbeth-3 isostearate, polyglyceryl-2 isostearate, polyglyceryl-3 isostearate, polyglyceryl-4 isostearate, polyglyceryl-5 isostearate, polyglyceryl-6 isostearate, polyglyceryl-10 isostearate, isosteareth-2, isosteareth-10, isosteareth-15, isosteareth-22, isostearoyl hydrolyzed collagen, isostearoyl hydrolyzed collagen AMPD, sodium isostearoyl lactate, isoceteth-10, isoceteth-20, octyl isopalmitate, polyglyceryl-2 isopalmitate, sucrose acetate isobutyrate, potassium undecylenoyl hydrolyzed collagen, ethylenediaminetetrakishydroxyisopropyldioleic acid, epoxyester-1, epoxyester-2, epoxyester-3, epoxyester-4, epoxyester-5, glyceryl erucate, PEG-4 octanoate, nonoxynol-14, octyldodeceth-2, octyldodeceth-5, octyldodeceth-10, octyldodeceth-30, TEA dextrin octenylsuccinate, octoxynol-1, octoxynol-2 sodium ethanesulfonate, octoxynol-10, octoxynol-25, octoxynol-70, olive oil PEG-6, oligosuccinic acid PEG-3-PPG-20, oleamide DEA, oleamine oxide, oleyl betaine, sodium oleyl sulfate, TEA oleyl sulfate, PEG-2 oleate, PEG-10 oleate, PEG-10 glyceryl oleate, PEG-15 glyceryl oleate, PEG-20 glyceryl oleate, PEG-30 glyceryl oleate, PEG-36 oleate, PEG-40 sorbitol oleate, PEG-75 oleate, PEG-150 oleate, PG oleate, sucrose oleate, hydroxy{bis(hydroxyethyl)amino}propyl oleate, oleamide DEA, polyglyceryl-2 oleate, polyglyceryl-5 oleate, polyglyceryl-10 oleate, oleoyl hydrolyzed collagen, oleoyl sarcosine, sodium methyl oleoyl taurate, oleth-2, oleth-3 DEA phosphate, oleth-7 sodium phosphate, oleth-8 sodium phosphate, oleth-10, oleth-10 phosphoric acid, oleth-10 DEA phosphate, oleth-20, oleth-20 phosphoric acid, oleth-30, oleth-50, olefin(C14-16) sodium sulfonate, cationized hydrolyzed wheat protein-1, cationized hydrolyzed wheat protein-3, cationized hydrolyzed conchiolin-2, cationized hydrolyzed soybean protein-1, cationized hydrolyzed soybean protein-2, cationized hydrolyzed soybean protein-3, cationized dextran-2, capramide DEA, tallow glyceride, apricot kernel oil PEG-6, distearyl citrate, fatty acid glyceryl citrate, quaternium-14, quaternium-18, quaternium-18 hectorite, quaternium 18 bentonite, quaternium-22, quaternium-33, corn oil PEG-6, corn oil PEG-8, cocamide, cocamide DEA, cocamide MEA, cocamide propylbetaine, cocamine oxide, sodium cocoamphoacetate, disodium cocoamphodiacetate, sodium polyoxyethylenetridecyl sulfate, disodium cocoamphodipropionate, sodium cocoamphopropionate, TEA cocoyl alaninate, PCA ethyl cocoyl arginate, sodium cocoyl isethionate, potassium cocoyl hydrolyzed casein, potassium cocoyl hydrolyzed keratin, potassium cocoyl hydrolyzed yeast, potassium cocoyl hydrolyzed yeast protein, potassium cocoyl hydrolyzed wheat protein, cocoyl hydrolyzed collagen, potassium cocoyl hydrolyzed collagen, sodium cocoyl hydrolyzed collagen, TEA cocoyl hydrolyzed collagen, potassium cocoyl hydrolyzed potato protein, potassium cocoyl hydrolyzed soybean protein, potassium cocoyl hydrolyzed corn protein, potassium cocoyl hydrolyzed potato protein, potassium cocoyl glycine, TEA cocoyl glycine, cocoyl glutamate, potassium cocoyl glutamate, sodium cocoyl glutamate, TEA cocoyl glutamate, cocoyl sarcosinate, sodium cocoyl sarcosinate, TEA cocoyl sarcosinate, sodium cocoyl taurate, methyl cocoyl alaninate, sodium methyl cocoyl alaninate, potassium methyl cocoyl taurate, magnesium methyl cocoyl taurate, sodium methyl cocoyl taurate, sodium cocoglyceryl sulfate, cocodimonium hydroxypropyl hydrolyzed keratin, cocodimonium hydroxypropyl hydrolyzed collagen, cocodimonium hydroxypropyl hydrolyzed silk, cocobetaine, PEG-50 hydrogenated castor oil succinate, fatty acid glyceryl succinate, choleth-10, choleth-15, isoceteth-3 acetate, ceteth-3 acetate, isobutyl acetate, ethyl acetate, glyceryl acetate, fatty acid glyceryl acetate, sucrose tetrastearate triacetate, trideceth-3 acetate, trideceth-15 acetate, butyl acetate, glyceryl monostearate acetate, laneth-9 acetate, fatty acid glyceryl diacetyltartarate, dialkyl(C12-15) dimonium chloride, dialkyl(C12-18) dimonium chloride, PEG-8 diisostearate, PG diisostearate, polyglyceryl-2 diisostearate, PEG-4 dioleate, PEG-10 dioleate, PEG-32 dioleate, PEG-75 dioleate, PEG-120 methylglucose dioleate, PEG-150 dioleate, PG dioleate, glycol dioleate, polyglyceryl-6 dioleate, ditallow dimonium cellulose sulfate, dicocodimonium chloride, glyceryl stearate diacetate, distearyl dimonium chloride, PEG-2 distearate, PEG-12 distearate, PEG-20 methylglucose distearate, PEG-120 distearate, PEG-250 distearate, PEG-trimethylolpropane distearate, PG distearate, PPG-20 methylglucose distearate, glycol distearate, glyceryl distearate, sucrose distearate, sorbitan distearate, polyglyceryl-6 stearate, dipolyglyceryl-10 distearate, dicetyldimonium chloride, MEA distearyl phosphate, dihydroxyethylstearyl betaine, PEG-3 dipalmitate, dihydroxyethyllauramine oxide, (dihydroxymethylsilylpropoxy)hydroxypropyl hydrolyzed casein, (dihydroxymethylsilylpropoxy)hydroxypropyl hydrolyzed collagen, (dihydroxymethylsilylpropoxy)hydroxypropyl hydrolyzed silk, dihydrocholeth-15, fatty acid (C8-22) polyglyceryl-10, dimethicone copolyol, ethyl dimethicone copolyol, butyl dimethicone copolyol, dimethyl stearamine, PEG-4 dilaurate, PEG-12 dilaurate, PEG-32 dilaurate, sucrose dilaurate, dilaureth-4 phosphate, dilaureth-10 phosphate, magnesium dilauroyl glutamate, lecithin hydroxide, hydrogenated cocoglyceride, hydrogenated soy glyceride, hydrogenated tallowamide DEA, disodium hydrogenated tallowyl glutamate, TEA hydrogenated tallowyl glutamate, hydrogenated lanolin, hydrogenated lanolin alcohol, hydrogenated lysolecithin, hydrogenated lecithin, steararamide, steararamide DEA, steararamide MEA, steararamideethyldiethylamine, steararamidepropyldimethylamine, stearamine oxide, stearalkonium chloride, stearalkonium hectorite, stearyldimethyl betaine sodium, stearyltrimonium saccharin, stearyltrimonium bromide, stearyl betaine, sodium stearyl sulfate, PEG-2 stearate, PEG-6 sorbitol stearate, PEG-10 stearate, PEG-10 glyceryl stearate, PEG-14 stearate, PEG-20 glyceryl stearate, PEG-23 stearate, PEG-25 stearate, PEG-40 stearate, PEG-100 stearate, PEG-120 glyceryl stearate, PEG-150 stearate, PEG-200 glyceryl stearate, PG stearate, TEA stearate, glycol stearate, glyceryl stearate, sucrose stearate, steareth-4 stearate, stearoyldihydroxyisobutylamide stearate, sorbitan stearate, polyoxyethylene cetylether stearate, polyglyceryl-2 stearate, polyglyceryl-10 stearate, glyceryl stearate/malate, steardimonium hydroxydipropyl hydrolyzed keratin, steardimonium hydroxydipropyl hydrolyzed collagen, steardimonium hydroxydipropyl hydrolyzed silk, steartrimonium chloride, steareth-2 phosphate, steareth-3, steareth-10, steareth-16, steareth-50, steareth-80, steareth-100, potassium stearoyl hydrolyzed collagen, sodium stearoyl hydrolyzed collagen, stearoyl glutamate, disodium stearoyl glutamate, potassium stearoyl glutamate, sodium stearoyl glutamate, dioctyldodecyl stearoyl glutamate, stearoyl colamino formylmethyl pyridium chloride, stearoyl calcium lactate, stearoyl sodium lactate, sodium stearoyl methyl taurate, disodium pareth sulfosuccinate (C12-14), disodium oleamide PEG-2 sulfosuccinate, disodium cocoyl isopropanolamide PEG-4 sulfosuccinate, disodium lauramide PEG-5 sulfosuccinate, sodium dioctyl sulfosuccinate, disodium sitostereth-14 sulfosuccinate, disodium lauryl sulfosuccinate, disodium laureth sulfosuccinate, sorbitan sesquiisostearate, glyceryl sesquioleate, sorbitan sesquioleate, diglyceryl sesquioleate, PEG-20 methylglucose sesquistearate, sorbitan sesquistearate, methylglucose sesquistearate, cetyl dimethicone copolyol, cetylpyridinium chloride, sodium cetyl sulfate, DEA cetyl phosphate, potassium cetyl phosphate, cetearyl alcohol, cetearyl glucoside•cetearyl alcohol, sodium cetearyl sulfate, ceteareth-10, ceteareth-15, ceteareth-22, ceteareth-34, ceteareth-55, ceteareth-60, ceteareth-60 myristyl glycol, ceteareth-100, ceteth-8 phosphate, ceteth-10, ceteth-10 phosphate, ceteth-12, ceteth-24, ceteth-45, cetrimonium chloride, cetrimonium saccharin, cetrimonium bromide, cetoleth-10, cetoleth-20, cetoleth-25, tallowamide MEA, polyglyceryl-10 decaisostearate, polyglyceryl-10 decaoleate, polyglyceryl-10 decastearate, decyl glucoside, diglycerol sorbitan tetraoctanoate, sorbeth-30 tetraoleate, sorbeth-40 tetraolate, sorbeth-60 tetraoleate, sorbeth-60 tetrastearate, TEA dodecylbenzene sulfonate, triPEG-8 alkyl (C12-15) phosphate, tri(isostearic acid PEG-3) trimethylolpropanate, PEG-10 glyceryl triisostearate, PEG-15 hydrogenated castor oil triisostearate, PEG-20 hydrogenated castor oil triisostearate, PEG-30 glyceryl triisostearate, PEG-30 hydrogenated castor oil triisostearate, PEG-50 glyceryl triisostearate, PEG-50 hydrogenated castor oil triisostearate, PEG-160 sorbitan triisostearate, polyglyceryl-2 triisostearate, sorbitan trioleate, polyglyceryl-10 trioleate, PEG-3 sorbitol tristearate, PEG-140 glyceryl tristearate, PEG-160 sorbitan tristearate, sucrose tristearate, sorbitan tristearate, polyglyceryl tristearate-10 trideceth-trisodium acetate, trideceth-hexasodium acetate, trideceth-9, trideceth-10, trideceth-11, trideceth-20, trideceth-21, trihydroxystearin, sucrose tribehenate, trilaurylamine, trilaureth-tetraphosphoric acid, trilaureth-sodium tetraphosphate, fatty acid glyceryl lactate, nonylnonoxynol-10, nonylnonoxynol-100, nonoxynol-3, sodium nonoxynol-4 sulfate, nonoxynol-6 phosphate, sodium nonoxynol-6 phosphate, nonoxynol-10, nonoxynol-10 phosphate, nonoxynol-23, nonoxynol-50, nonoxynol-120, perfluoroalkyl PEG phosphate, perfluoroalkyl phosphate DEA, palm kernelamide DEA, sodium palm kernelamide ethylhydroxyethylamino propionate, palm kernelamide propyl betaine, sodium palmoyl glutamate, palmitamide MEA, PEG-6 palmitate, PEG-18 palmitate, PEG-20 palmitate, sucrose palmitate, sorbitan palmitate, diTEA palmitoyl aspartate, sodium palmitoyl methyl taurine, peanut oil PEG-6, hydroxyglyceryl stearate, hydroxypropyltrimonium hydrolyzed casein, hydroxypropyltrimonium hydrolyzed keratin, hydroxypropyltrimonium hydrolyzed wheat protein, hydroxypropyltrimonium hydrolyzed collagen, hydroxypropyltrimonium hydrolyzed silk, hydroxy lanolin, PPG-2 myristyl propionate, polyglyceryl-10 heptastearate, methyl imidazolinium heptadecylhydroxyethylcarboxylate, behenamide propyl PG dimonium chloride, behenamine oxide, beheneth-10, beheneth-30, glyceryl behenate, behentrimonium chloride, benzalkonium chloride, polyglyceryl-10 pentaisostearate, diglycerol sorbitan pentaoctanoate, PEG-40 sorbitol pentaoleate, polyglyceryl-6 pentaoleate, polyglyceryl-10 pentaoleate, polyglyceryl-10 pentastearate, potassium polyacrylate, sodium polyacrylate, ammonium polyacrylate, polyoxyethylene alkylphenylether phosphate TEA, sodium polyoxyethylene ether phosphate, polyoxyethylene octylether phosphate, polyoxyethylene cetylstearyl diether, polyoxyethylene phytostanol, polyoxyethylene butyl ether, polyoxyethylene cocodiethanolamide, polyoxyethylene laurylether phosphate TEA, polyoxypropylene carboxyalkyl(C14-18) diglucoside, polyoxypropylene glycerylether phosphate, polyoxypropylene sorbitol, sucrose polyoleate, polyglyceryl-2 oleyl ether, sucrose polystearate, cetyl acetate, acetylated lanolin alcohol, sucrose polypalmate, sucrose polylaurate, polyglyceryl polyricinoleate, sucrose polylinoleate, poroxamer 181, poroxamer 333, poroxamine 304, poroxamine 901, poroxamine 1104, poroxamine 1302, poroxamine 1508, hydroxyalkyl(C12,14) maltitol ether, myristamide DEA, myristamine oxide, myristalkonium chloride, myristyl PG hydroxyethyl decanamide, myristyl betaine, sodium myristyl sulfate, PEG-8 myristate, PEG-20 myristate, glyceryl myristate, sucrose myristate, polyglyceryl-10 myristate, myreth-3 myristate, myristoyl hydrolyzed collagen, potassium myristoyl hydrolyzed collagen, myristoyl glutamate, potassium myristoyl glutamate, sodium myristoyl glutamate, sodium myristoyl sarcosinate, sodium myristoyl methyl alanine, sodium myristoyl methyl taurate, myreth-3, sodium myreth-3 sulfate, glyceryl monoacetate monostearate, TEA cocoate, glyceryl cocoate, sucrose cocoate, sorbitan cocoate, lycine cocoate, DEA lauramide, MEA lauramide, lauramide propyl betaine, sodium lauramino diacetate, lauramino propionate, sodium lauramino propionate, lauramine oxide, sodium laurimino dipropionate, lauryl DEA, lauryl isoquinolinium saccharinate, lauryl isoquinolinium bromide, lauryl glucoside, sodium lauryl diaminoethyl glycine, lauryl dimonium hydroxypropyl hydrolyzed keratin, lauryl dimonium hydroxypropyl hydrolyzed collagen, lauryl dimonium hydroxypropyl hydrolyzed silk, lauryl sulfosodium acetate, sodium lauryl hydroxyacetamide sulfate, lauryl hydroxysultaine, lauryl pyridinium chloride lauryl betaine, lauryl sulfate DEA, potassium lauryl sulfate, lauryl sulfate MEA, magnesium lauryl sulfate, sodium lauryl sulfate, lauryl sulfate TEA lauryl sulfate ammonium, lauryl phosphate, disodium lauryl phosphate, sodium lauryl phosphate, PEG-2 laurate, PEG-4 DEA laurate, PEG-6 laurate, PEG-8 laurate, PEG-8 glyceryl laurate, PEG-9 laurate, PEG-10 laurate, PEG-12 glyceryl laurate, PEG-23 glyceryl laurate, PEG-32 laurate, PEG-75 laurate, PEG-150 laurate, PEG sorbitol laurate, PG laurate, TEA laurate, glyceryl laurate, sucrose laurate, polyoxyethylene hydrogenated castor oil laurate, polyglyceryl-6 laurate, polyglyceryl-10 laurate, maltitol laurate, laurtrimonium chloride, laurtrimonium bromide, ammonium laureth-2-sulfate, laureth-3 acetate, TEA laureth-3 sulfate, ammonium laureth-3 sulfate, laureth-3 phosphate, laureth-4 phosphate, sodium laureth-4 phosphate, potassium laureth-4.5 acetate, laureth-5 acetate, sodium laureth-5 sulfate, laureth-6 acetate, sodium laureth-6 acetate, laureth-7 phosphate, laureth-9, laureth-10, laureth-10 acetate, potassium laureth-10 acetate, sodium laureth-16 acetate, sodium laureth-17 acetate, laureth-40, TEA laureth sulfate, sodium lauroampho PG acetate phosphate, sodium lauroampho acetate, lauroyl aspartate, potassium lauroyl hydrolyzed collagen, sodium lauroyl hydrolyzed collagen, sodium lauroyl hydrolyzed silk, lauroyl glutamic acid, potassium lauroyl glutamate, sodium lauroyl glutamate, TEA lauroyl glutamate, dioctyldodecyl lauroyl glutamate, dioctyl dodeceth-2 lauroyl glutamate, dioctyldodecyl lauroyl glutamate, dicholesteryl lauroyl glutamate, disteareth-2 lauroyl glutamate, disteareth-5 lauroyl glutamate, lauroyl sarcosine, sodium lauroyl sarcosine, TEA lauroyl sarcosine, potassium lauroyl threonine, sodium lauroyl lactate, lauroyl methylalanine, sodium lauroyl methylalanine, TEA lauroyl methylalanine, sodium lauroyl methyltaurine, laneth-10, laneth-25, laneth-40, laneth-75, PEG-4 lanolin fatty acid, PEG-12 lanolin fatty acid, DEA lanolin amide, isopropyl lanolin fatty acid, octyldodecyl lanolin fatty acid, glyceryl lanolin fatty acid, cholesteryl lanolin fatty acid, lapirium chloride, ricinoleamidopropyl betaine, glyceryl ricinoleate, sucrose ricinoleate, polyoxypropylene sorbitol ricinoleate, polyglyceryl-6 ricinoleate, lanolin linoleate, linoleamide DEA, sulfated castor oil, malic acid lauramide, rosin hydrolyzed collagen, and rosin hydrolyzed collagen AMPD.

Aside from these surfactants, fluoro surfactants also may be used. Specific examples include ammonium heptadecafluoro-1-octanesulfonate, ammonium pentadecafluorooctanoate, heptadecafluorooctanesulfonate, lithium heptadecafluoro-1-octanesulfonate, pentadecafluorooctanoate, pentadecafluorooctanoic acid hydrate, and potassium heptadecafluoro-1-octanesulfonate.

Examples of other usable surfactants include N-long chain acylamino acid salts such as N-long chain acyl neutral amino acid salts (e.g., N-long chain acylglutamate, N-long chain acylaspartate, N-long chain acylglycine salt, N-long chain acylalanine salt, N-long chain acylthreonine salt, and N-long chain acyl sarcosine salt);

N-long chain fatty acid acyl-N-methyltaurine salt;

alkyl sulfates and alkylene oxide adducts thereof;

anionic surfactants such as metal salts of fatty acid amide ether sulfate, metal salts of fatty acids, sulfosuccinic acid surfactants, alkyl phosphates and alkylene oxide adducts thereof, higher alkyl sulfate ester salts, alkyl ether sulfate ester salts, alkyl hydroxyether carboxylate ester salts, and alkyl ether carboxylic acid;

ether surfactants such as glycerine ether and alkylene oxide adducts thereof;

ester surfactants such as glycerine ester and alkylene oxide adducts thereof;

ether ester surfactants such as sorbitan ester and alkylene oxide adducts thereof;

fatty acid alkylolamides such as fatty acid monoethanolamide, and fatty acid diethanolamide;

ester surfactants such as polyoxyalkylene fatty acid ester, polyoxyalkylene polyalcohol fatty acid ester, polyoxyalkylene sorbitan fatty acid ester, polyoxyalkylene hydrogenated castor oil, glyceryl monostearate, glycerine ester, fatty acid polyglycerin ester, acylamino acid polyglycerin ester, sorbitan ester, and sucrose fatty acid ester;

alkyl glucosides;

hydrogenated castor oil pyroglutamic acid diester, and-ethylene oxide adducts thereof;

non-ionic surfactants such as nitrogen-containing non-ionic surfactants (e.g., fatty acid alkanolamide);

aliphatic amine salts such as alkyl ammonium chloride, dialkyl ammonium chloride, alkyl trimethylammonium (C16-C22) chloride, dialkyl dimethylammonium methosulfate, and quaternary ammonium salts thereof;

cationic amphiphatic compounds such as aromatic quaternary ammonium salts (e.g., benzalkonium salts), fatty acid acyl arginine ester, N-long chain acylarginine ethylpyrrolidonecarboxylate, amideamines, stearamidepropyldimethylamine glutamate, stearamidepropyldimethylamine lactate, stearamidepropyldimethylaminepyrrolidone carboxylate, behenamidopropyldimethylamine glutamate, behenamidopropyldimethylamine lactate, and behenamidopropyldimethylaminepyrrolidone carboxylate;

betaine-type amphiphatic compounds such as alkyl betaine, alkylamide betaine, sulfobetaine, imidazolinium betaine, aminopropionate, and carboxybetaine; and ampholytic surfactants such as N-long chain acylarginine, N-(3-alkyl(12,14)oxy-2-hydroxypropyl)arginine hydrochloride, aminocarboxylic acid surfactants, and imidazoline surfactants.

(Sugar)

The sugar includes monosaccharides, disaccharides, oligosaccharides, polysaccharides, and derivatives thereof. Specific examples of the monosaccharides include glucose, and fructose. Specific examples of the disaccharides include trehalose, and sucrose. Examples of the polysaccharides include heparin, chondroitin sulfate, pullulan, pectin, guar gum, xanthan gum, carrageenan, propylene glycol, and carboxymethyl cellulose.

Maltose can provide a more desirable polymer membrane than glucose. Disaccharides and polysaccharides tend to provide a more stable polymer membrane than monosaccharides, though the polymer membrane can also be obtained from monosaccharides. The sugar may have a cyclic structure (pyranose, furanose) or a chain structure, and either structure may be used without a problem. However, a more desirable membrane tends to form with a cyclic structure. A desirable polymer membrane can be obtained with sugars such as pullulan and trehalose.

(Fatty Acid)

A fatty acid with a longer carbon chain can form a more flexible polymer membrane, and unsaturated fatty acids tend to form a more stable polymer membrane than saturated fatty acids. Particularly preferred as unsaturated fatty acids are oleic acid, linoleic acid, linolenic acid, and erucic acid. A preferred saturated fatty acid is lauric acid.

(Fatty Acid Ester)

The polymer membrane also can be obtained from a fatty acid ester. A preferred fatty acid ester is an n-dodecyl stearate.

(Metal Alkoxide)

The polymer membrane also can be obtained from a metal alkoxide. A metal alkoxide is a compound represented by MOR, where M represents a metal, and RO$^-$ represents an alkoxide (R is a hydrocarbon). Specific examples of the metal (M) include silicon, titanium, aluminum, boron, zirconium, boron, vanadium, tungsten, phosphorus, germanium, indium, hafnium, and molybdenum. The metal alkoxides can be obtained from various alcohols. These metal alkoxides may be used either directly, or as a reaction product of a sol-gel reaction performed in the presence of an acid or an alkali. A desirable polymer membrane can be obtained with tetraethoxysilane (TEOS).

(Hydrocarbon Compound Having Allyl Group)

Hydrocarbon compounds having an allyl group may be used as monomers for the plasma or electron beam polymerization. For example, deposition has been confirmed for 1,3-diallylimidazolium salts, a type of ionic liquid. A desirable polymer membrane also can be obtained with methacroylcholine chloride.

These starting material compounds are dissolved in a solvent such as water and an organic solvent in appropriate concentrations to prepare a solution, taking into account factors such as viscosity. The solution is then used to form a thin membrane on a base material surface by using a known coating method such as spin coating. Other than a substrate, the base material may have a variety of shapes with a surface that allows for formation of a thin membrane. For example, the thin membrane may be formed on a biological surface with a microstructure such as on a small animal, a material of high water content such as a gel, or a liquid such as an ionic liquid.

The exposed surface of the thin membrane is irradiated with a plasma or an electron beam to cause a polymerization reaction, and form an organic polymer thin membrane of a composition that is gradually polymerized from the thin membrane surface into the membrane in the cross sectional direction of the membrane. The organic polymer thin membrane may then be detached from the base material to form a self-supporting membrane. The method used to detach the organic polymer thin membrane from the base material is not particularly limited, and the membrane may be detached by using methods such as dipping in a solvent, physical detachment, and changing temperatures.

The organic polymer thin membrane is formed of an organic polymer, and has a composition that is gradually polymerized from the thin membrane surface into the membrane in the cross sectional direction of the membrane. For example, only the exposed surface of the thin membrane is irradiated with a plasma or an electron beam to cause a polymerization reaction, and the polymer membrane is detached from the base material to form a self-supporting membrane. The self-supporting membrane typically has a composition that is gradually polymerized from one surface to the other surface of the thin membrane along the cross sectional direction. The self-supporting membrane so produced may be further irradiated with a plasma or an electron beam from the other surface to cause a polymerization reaction, and create a gradually polymerized composition from the thin membrane surfaces (both surfaces) into the cross sectional direction of the membrane (into the membrane).

As used herein, "having a composition that is gradually polymerized in the cross sectional direction of the thin membrane" means that the composition is homogeneous along the plane direction of the thin membrane, and that the chemical composition varies in the cross sectional direction perpendicular to the plane direction. It is believed that the gradual change in the chemical composition of the membrane occurs as a result of the plasma or electron beam irradiation of the exposed surface of the thin membrane, causing a polymerization reaction that proceeds in a gradually varied manner along the cross sectional direction from the exposed surface to the back surface. Because the polymerization reaction takes place earlier on the exposed surface of the thin membrane than on the base material side of the membrane, the polymer membrane does not strongly adhere to the base material, and can easily be detached therefrom to obtain a supporting membrane (self-supporting membrane) of a desired shape. This is also associated with the gradually polymerized chemical composition of the thin membrane along the cross sectional direction.

The gradually polymerized composition may be confirmed by using at least one of the following techniques, as will be described later in Examples.

Transmission electron microscopy of a cross section across the thin membrane from the irradiated surface to the non-irradiated surface after osmium staining of the thin membrane Energy dispersive X-ray inner composition analysis of the thin membrane from the irradiated surface to the non-irradiated surface Atomic force microscopy of surface structures on both surfaces of the thin membrane Glazing-incidence small angle X-ray scattering orientation analysis of both thin membrane surfaces The gradually polymerized composition depends on deposition conditions, for example, such as plasma irradiation time (for example, 3 to 30 min), and the type of the gas used for plasma polymerization (such as oxygen gas, and nitrogen gas), and may be controlled by varying these conditions.

Increasing the polymerization time polymerizes the whole membrane, and the gradually polymerized composition along the cross sectional direction may be eliminated by increasing the polymerization time.

The thickness of the organic polymer thin membrane formed on a base material surface, or the thickness of the self-supporting membrane detached from the base material surface is not particularly limited, and may be, for example, 5 nm to 100 µm.

The polymerization by plasma irradiation can be performed, for example, by using a common ion sputtering apparatus under the conditions of $10^{-3}$ to $10^5$ Pa pressure, −20 to +80° C. temperature, 1 to 10 kV DC voltage, and 5 to 500 mm irradiation distance. Alternatively, the polymerization can be performed by using a device such as a reaction tube, or an atmospheric pressure plasma irradiator used in conventional plasma polymerizations.

The electron beam irradiation is not particularly limited, and can be performed, for example, by irradiation of an electron beam from a scanning electron microscope (SEM) (for example, about 5.0 kV).

The electron beam is obtained, for example, by passing current through a filament disposed at the center of a chamber maintained in a vacuum, extracting the heated and released thermoelectrons into a grid, and applying an acceleration voltage to produce an electron flow that emerges to outside through a window. For this purpose, a structure of an electron microscope, or a structure of a small electron beam tube or a small electron beam tube module can be used. A sample can be irradiated with the accelerated electrons in a vacuum or in the atmosphere (while displacing the gas). In the latter case, the electrons accelerated in a vacuum under the power voltage pass through an electron passage window, and reach the target thin membrane of the starting material compound solution through the atmospheric layer between the window and the thin membrane of the starting material compound solution.

The present invention established a novel technique for fabricating a self-supporting membrane from, for example, a viscous solution of solvent-soluble compounds. The membrane has a composition that is gradually polymerized from the membrane surface into the membrane in the cross sectional direction of the membrane, and has, for example, different structures on the front and back of the membrane. Specifically, the invention provides a novel technique for fabricating a thin membrane of biocompatible compounds, and the thin membrane has great potential as a base material in medical and cell culture applications.

The self-supporting membrane can be fabricated by using the method of the present invention with a conductive ionic liquid used as a starting material compound. The thin membrane has conductivity in both horizontal and vertical directions, and is transparent with a transmittance of 95% or more. The thin membrane thus has potential as a transparent conductive membrane.

The polymer membrane also can be used with existing techniques by being combined with functional materials such the ionic liquid (conductive), metal catalysts (antimicrobial), fluorescent materials (indexical), titanium oxide and zinc oxide (photo catalysts), metal nano fine particles and colloid fine particles (optical properties), chiral materials (circular dichroism), and carbon materials (rigidity). Alternatively, the polymer membrane can be formed with template molecules or materials, and can be removed to obtain a porous membrane by using an appropriate method.

The self-supporting membrane of the present invention having a gradually polymerized composition from the membrane surface into the membrane in the cross sectional direction, and having different structures on the front and back of the membrane is similar in structure to the cuticular structure of living organisms. The self-supporting membrane thus should develop excellent membrane characteristics (gas barrier property, and liquid permeability) similar to that seen at the outer skin of living organisms. It is particularly expected to introduce new criteria in potential optical applications, such as differences in mechanical property, swelling behavior, and molecule selective adsorbability based on the gradually polymerized composition. These are considered to be specific functions based on undefined factors due to the different front and back structures, different from the functions arising from the highly accurate defined factors based on calculations in the fields of physics and chemistry. It is therefore considered possible to develop excellent membrane characteristics through applications and developments of the present invention.

The organic polymer thin membrane of the present invention is preferred for use in, for example, medical biology, medical engineering, agriculture, observation of biosamples, engineering, drug delivery system, gas barrier membrane, bonding, and surface treatment.

The organic polymer thin membrane of the present invention has potential use particularly in areas of, for example, drug sheets, fuel cell stacks, cell culture sheets, protective sheets, filters, and sterile membranes.

In the case of drug sheet applications, the organic polymer thin membrane of the present invention can be impregnated with drug molecules to indirectly administer the drug to the affected area as in fomentation. In this manner, the organic polymer thin membrane of the present invention can be used as a fomentation, and can be disposed as a combustible waste, or can be scrubbed down with water. The organic polymer thin membrane of the present invention also can be used as a commercially available wet-type sticking plaster, or "moist adhesive bandage" as it is also called. In another possible application, the organic polymer thin membrane can be used as a drug sheet by being directly attached to cancerous cell tissues to directly administer the drug to the affected area. As another example, an unpolymerized starting material compound solution can be applied to an affected area, and irradiated with an atmospheric pressure plasma to protect the affected area.

The organic polymer thin membrane of the present invention also has potential use as the base material of, for example, a cell, a separator, a gas diffusion layer, a hydrogen electrode, an electrolyte membrane, an air electrode, a gas diffusion layer, and a separator that are laminated in order to make a fuel cell stack. The invention enables forming a sheet in one-pot even for compounds that have been used as "molten salts", making it possible to form an electrolyte membrane and other such membranes with ease. It is also possible to obtain a sheet-like electrode through vapor deposition of metal on the sheet. When used as a stack base material, the organic polymer thin membrane of the present invention contributes to miniaturizing the stack.

When the organic polymer thin membrane of the present invention is used as a cell culture sheet, the hydrophilic surface of the sheet absorbs the culture medium, and swells upon being dipped in such liquids. A cell culture sheet with the absorbed culture medium can thus be used to culture cells even in a dry environment, and can replace conventional culture media of a solution or gel form.

A protective sheet using the organic polymer thin membrane of the present invention can be used to wrap products and other commodities. For example, a protective sheet using the organic polymer thin membrane of the present invention can provide an inexpensive way of coating cars to protect these products from being damaged during the delivery from a plant to dealers on a transporter, as compared to the conventional polymer coating or coating with a sheet. A protective sheet using the organic polymer thin membrane of the present invention also can be used as a filming material to prevent decomposition or degradation of vegetables, fruits, and other such products. The organic polymer thin membrane of the present invention also can provide a plasma polymerization coating that takes advantage of the characteristics (e.g., flatness, pinhole-free) of the plasma polymer membrane to obtain a uniform coating surface.

A filter using the organic polymer thin membrane of the present invention has the effect to adsorb contaminants, and can be used to adsorb contaminated water to purify water. A filter using the organic polymer thin membrane of the present invention also can be used for liquid/solid extraction, and can provide a film-like TLC with an adsorbent silica gel. It is also possible to selectively arrange molecules by controlling the surface functional groups. The filter also can be used as an optical (polarization) filter by using optically active molecules for the monomer molecules of the starting material compound.

A sterile membrane using the organic polymer thin membrane of the present invention is pinhole-free by virtue of the plasma treatment, and does not allow for passage of microorganisms. The membrane can thus be used to protect food.

EXAMPLES

The present invention is described below in greater detail using Examples. It should be noted, however, that the present invention is in no way limited by the following Examples.

Example 1

Tween 20 was used as the starting material compound. Tween 20 was dissolved in ethanol in 50% (v/v) concentration, spread over glass with a spin coater (3000 rpm, 5 s; SC8001, Aiden), and fabricated a self-supporting thin membrane by plasma polymerization. The polymerized thin membrane was separated from the glass plate in ethanol.

The plasma polymerization typically used an ion sputtering apparatus (JFC-1100, JEOL) in a state of a metal target removed, and was performed in about a 1.0 Pa vacuum under 1.0 kV DC (8.0 mA) at room temperature for 3 minutes over an irradiation distance of 30 mm.

In order to investigate the differences in the molecular bonding state of the membrane by using osmium ($OsO_4$) staining, measures were taken to avoid the molecular state changes due to the permeation of a fixing solution generally seen in electron microscopy. Specifically, transmission electron microscopy (TEM) was performed according to the following procedures (1) to (7) after treating thin slices of a resin-replaced deposited membrane with 2% OsO$_4$ for 10 minutes while taking the best effort to maintain the molecular bonding state of the membrane, and vapor depositing carbon to increase conductivity.

(1) Resin replacement: hydrophilic epoxy resin Quetol 651: Quetol 651 100% 4 hr (2) Resin embedding: Quetol 651 epoxy resin (Quetol 651, mixed with NSA and MNA)

(3) Resin polymerization: 60° C. 48 hr (4) Slicing: ultramicrotome (Reichert: OmU4), a 0.2 μm thick slice was prepared, and placed on a hydrophilically treated nickel grid (5) Staining: 2% osmium tetraoxide aqueous solution, 10 min (6) Vapor deposition: carbon vapor deposition (7) Observation: transmission electron microscope (JEM1220: JEOL)

FIG. 1 shows the TEM images. In the figure, a, b, and c are magnified views of the portions a, b, and c in the upper left picture of the figure. In the TEM observation of the membrane treated as above, a thick black line occurred at the plasma irradiated surface as shown on the right-hand side of the image in the upper left picture, and the image became darker away from the irradiated surface, indicating that directional deposition was possible. Specifically, this was indicative of the polymerization having taken place at the plasma irradiated surface, and, to a lesser extent, on the other surface.

Figure 2:
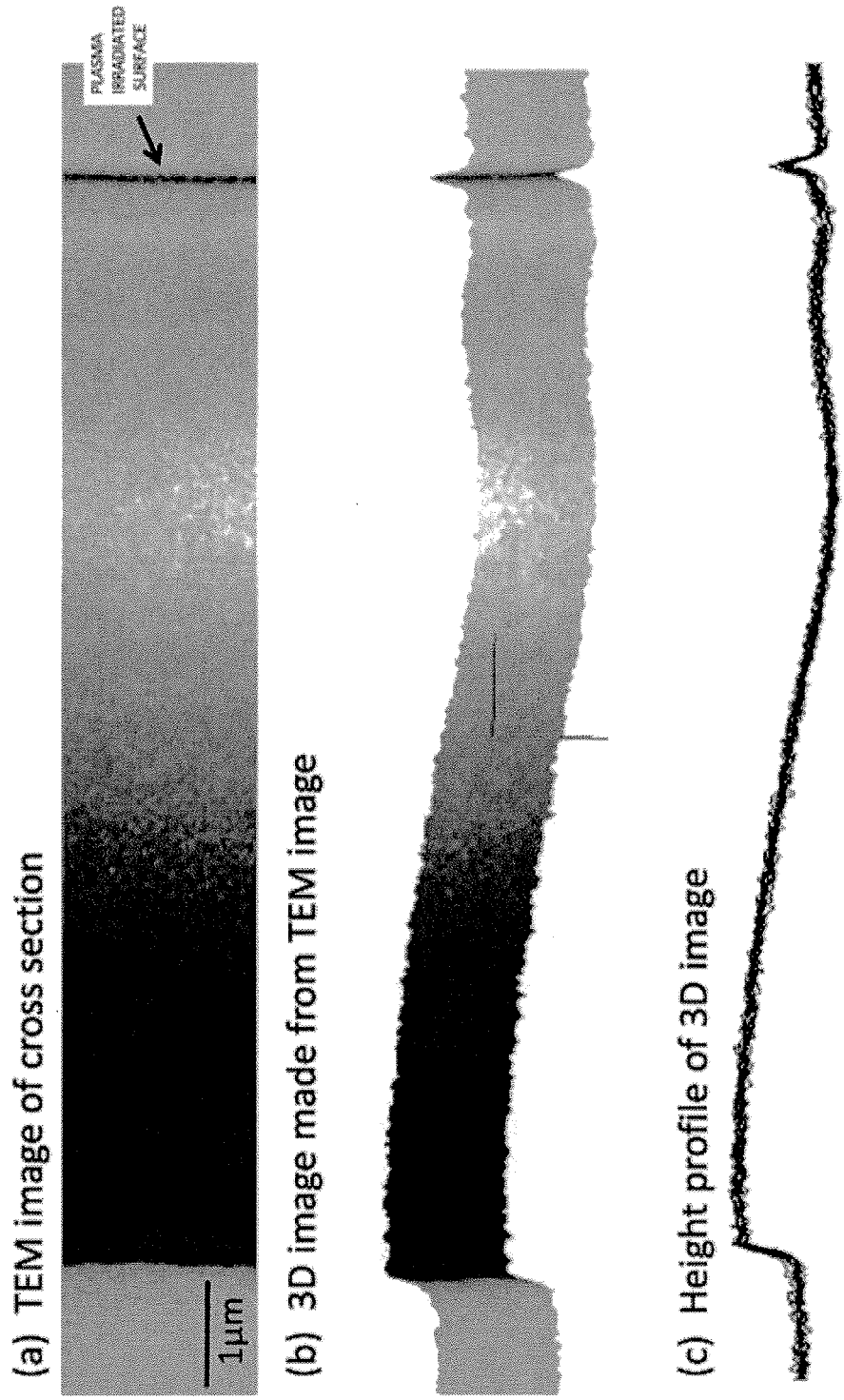
FIG. 2 represents views obtained from the TEM image in the upper left picture of FIG. 1, in which (a) represents the result of the brightness analysis of stain concentration, (b) is a three-dimensional image, and (c) represents the height profile of the concentrations.

A stain concentration analysis was performed (FIG. 2). FIG. 2 represents views obtained from the TEM image in the upper left picture of FIG. 1, in which (a) represents the result of the brightness analysis of stain concentration, (b) is a three-dimensional image, and (c) represents the height profile of the concentrations.

The OsO$_4$ adsorption was graded from the irradiated surface to the non-irradiated surface, as can be seen from the different adsorption levels for the irradiated surface and the non-irradiated surface.

Figure 3:
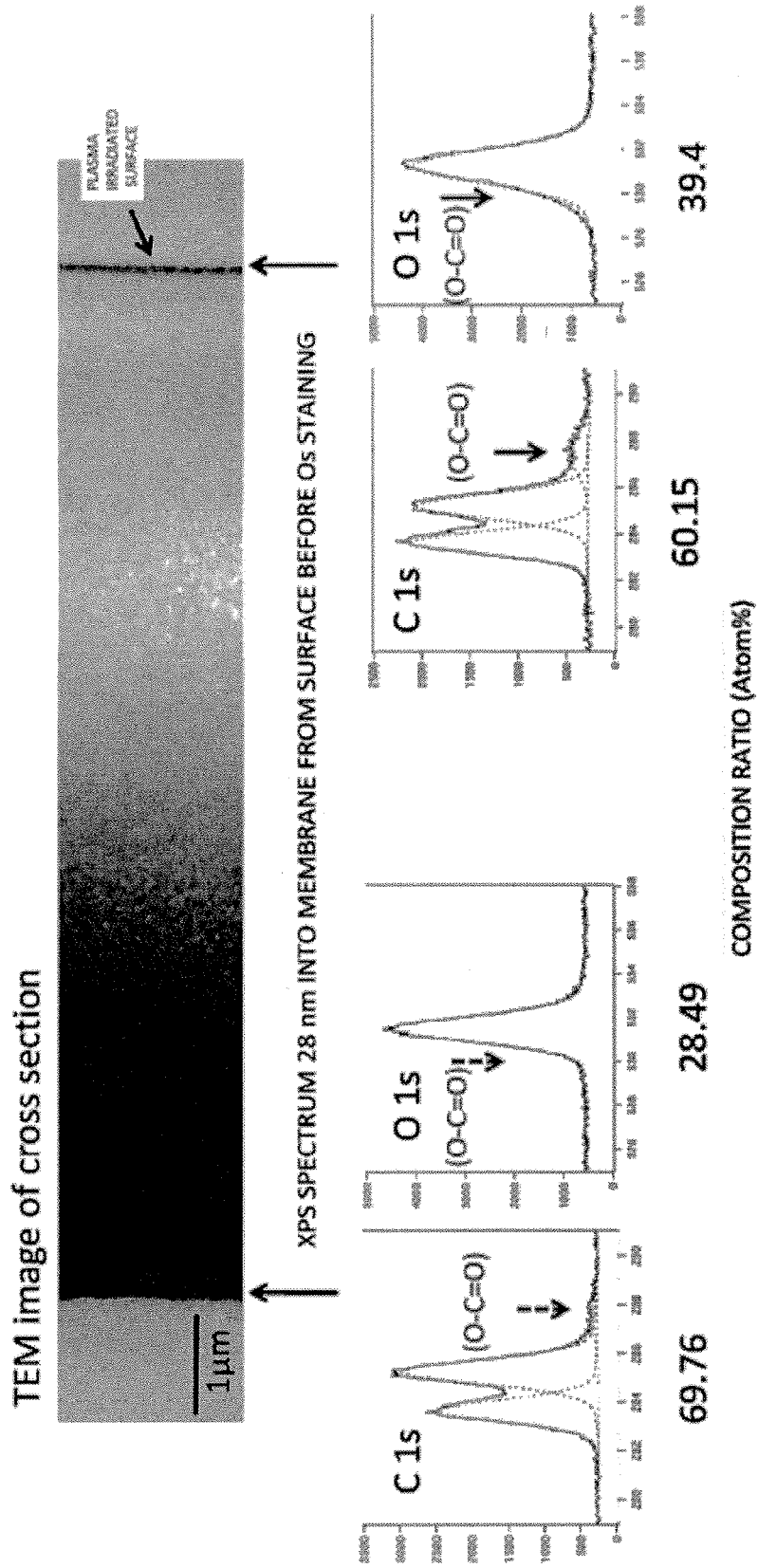
FIG. 3 represents the result of an XPS surface composition analysis of the thin membrane obtained in Example 1.

FIG. 3 represents the result of an XPS surface composition analysis of the polymer membrane. The irradiated surface and the non-irradiated surface were shown to be carboxyl rich and hydroxyl rich, respectively, at the outermost surfaces, indicating that the molecular structures were different on the front and back of the membrane. It is believed that the composition of the irradiated surface was due to the effect of the surface oxidation by the oxygen plasma from the oxygen in air. The non-irradiated surface is believed to be the polymer structure of the PEG chain resulting from the radicals generated by the oxygen or nitrogen plasma. It was thus confirmed that the membrane with the gradually polymerized composition from the irradiated surface to the non-irradiated surface had different outermost surface structures.

The surface tension was 41.0 N/m for the irradiated surface, and 22.9 N/m for the non-irradiated surface as measured by Kaelble-Uy approximation. The larger numbers of polar groups on the irradiated surface make the irradiated surface more wettable, whereas the non-irradiated surface is less wettable because of the smaller numbers of polar groups.

The polymer membrane was stained with toluidine blue, which easily binds to the polar carboxyl group, and observed with a light microscope (FIG. 4). The polymer membrane was found to be more strongly stained toward the plasma irradiated surface. The result is supportive of the presence of the larger numbers of carboxyl groups on the outermost surface of the irradiated surface.

Example 2

In Examples 2 to 12, SEM observation was typically performed with a field emission electron scanning microscope (FESEM, S-4800; Hitachi) under a 5.0 kV acceleration voltage. SEM image data were directly sent to a video recorder (hi-band digital formatted video recorder, Pioneer, DVR-DT95) to record the dynamic movements of a bio-sample.

TEM observation was typically performed with JEM-1220 (JEOL) under a 120 kV acceleration voltage.

Plasma polymerization typically used an ion sputtering apparatus (JFC-1100, JEOL) in a state of a metal target removed, and was performed in about a 1.0 Pa vacuum under 1.0 kV DC (8.0 mA) at room temperature for 3 minutes over an irradiation distance of 30 mm.

In Example 2, Tween 20 was used as the starting material compound. Tween 20 was dissolved in ethanol in 50% (v/v) concentration, spread over glass with a spin coater (3000 rpm, 5 s; SC8001, Aiden), and fabricated a self-supporting thin membrane by plasma polymerization. The polymerized thin membrane was separated from the glass plate in ethanol.

Figure 5:
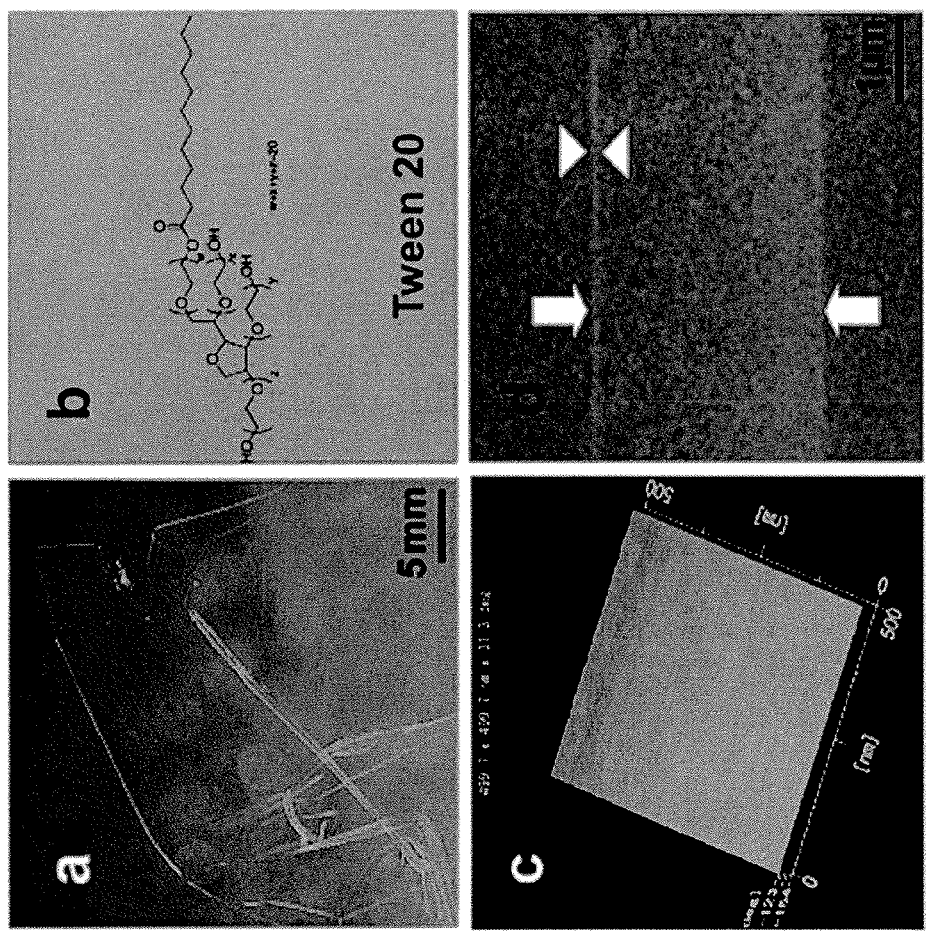
FIG. 5 shows photographic images of the polymer membrane of Example 2.

FIG. 5 shows (a) a light micrograph of the self-supporting polymer membrane (Tween 20) fabricated by plasma polymerization, (b) the chemical formula of Tween 20, (c) an AFM image of a membrane surface, and (d) a TEM image of a membrane cross section. The portion between arrowheads in (d) is the Tween 20 polymer membrane. A thin layer was formed at the irradiated surface (the portion between the triangle markers).

A 1% aqueous solution of the starting material compound Tween 20 was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

Figure 6:
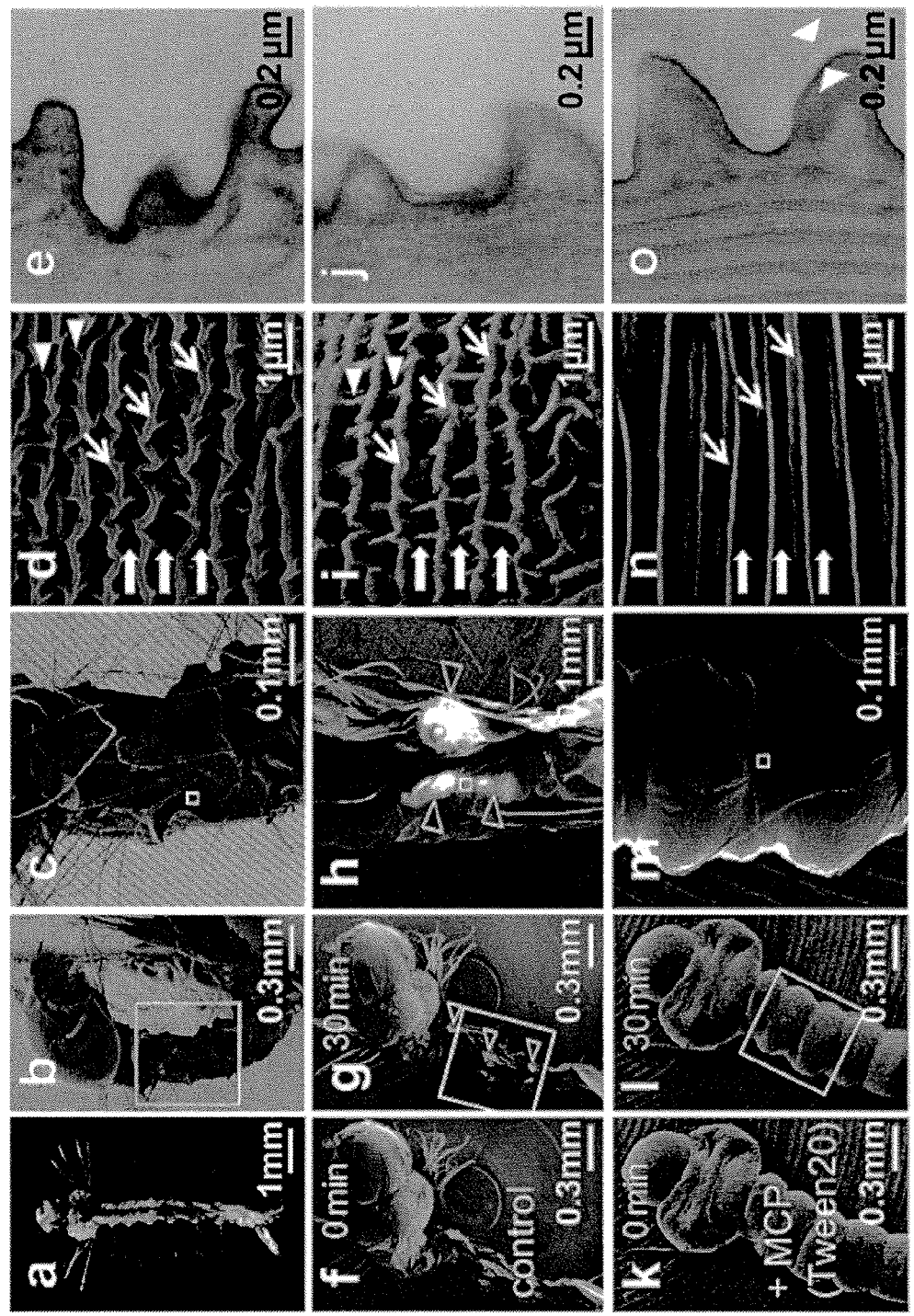
FIG. 6 shows photographic images of the polymer membrane of Example 2 and SEM video images of the polymer membrane on a sample surface.

The larva was then placed in a SEM sample chamber, and video images were taken (FIG. 6). The mosquito larva was seen to move even after the start of electron beam irradiation, suggesting that the thin membrane on the body surface was polymerized under the electron beam and the Tween 20 polymer membrane was formed.

FIG. 6 shows conventional SEM images, and novel SEM images of a sample coated with the plasma irradiated membrane (Tween 20). In FIG. 6, (a) is a light micrograph of a mosquito larva, (b) to (d) are conventional SEM images, (f) to (n) are plasma irradiated individuals ((f-i), without Tween 20; (k-n), with Tween 20), and (e, j, o) are TEM images of sample cross sections.

A living mosquito larva (a, time 0) was irradiated with an electron beam for 30 minutes under a high vacuum inside the SEM chamber (b-d, time 30). The triangle markers indicate an electrostatically charged area.

In f-i, a living mosquito larva coated with 1% Tween 20 was plasma irradiated for 3 minutes (f, time 0), and observed by SEM for 30 minutes (g-i).

In k-n, a living mosquito larva was irradiated with an electron beam by conventional SEM (k, time 0), and observed (l-n).

The boxes in b, g, and l were enlarged (c, h, m). Further enlarged views are shown in d, i, and n.

The pictures e, j, and o are TEM images of sample cross sections, and the layer seen between the triangle markers is the polymer membrane formed by the plasma treatment.

Example 3

Figure 7:
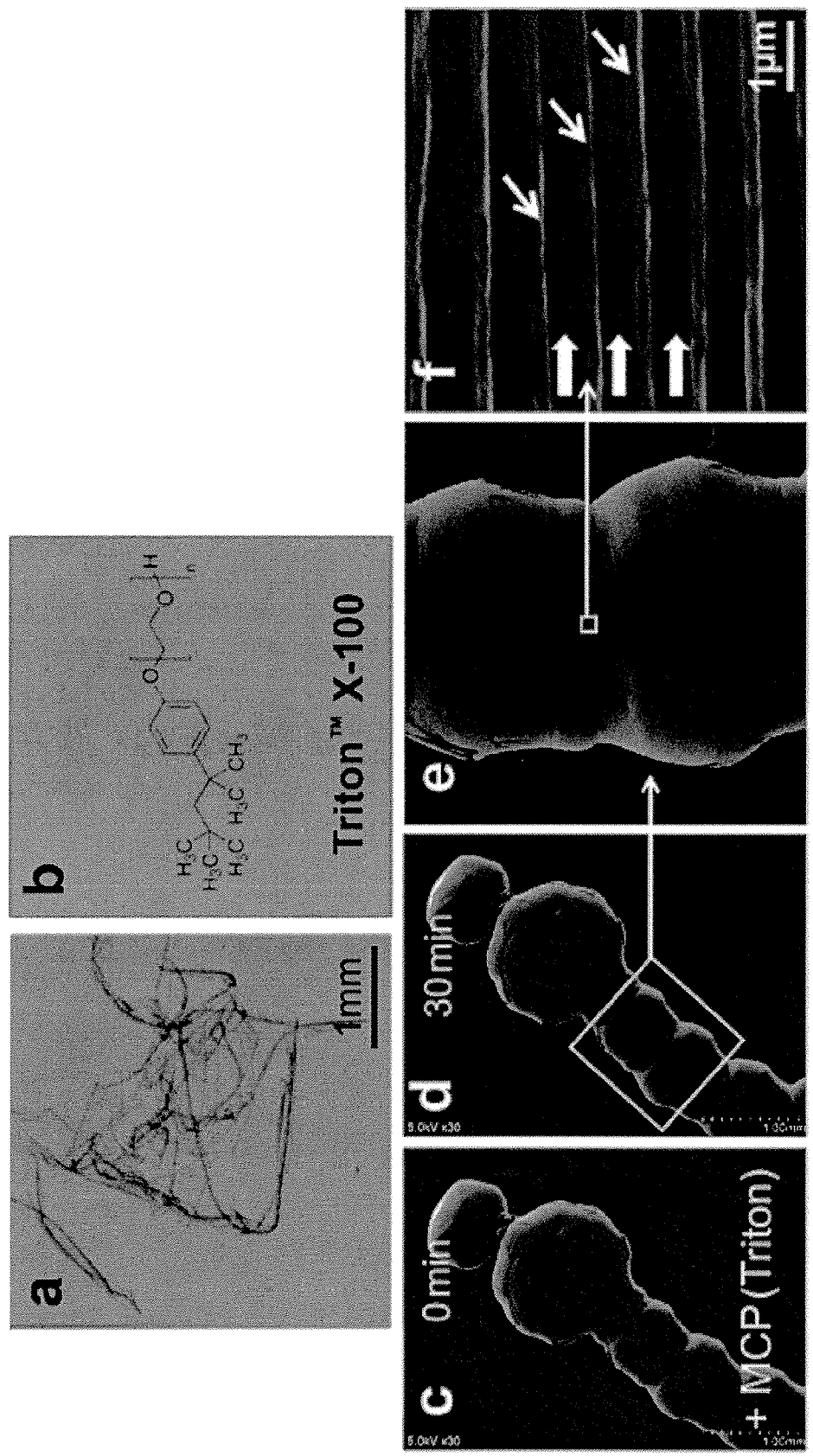
FIG. 7 shows photographic images of the polymer membrane of Example 3 and SEM video images of the polymer membrane on a sample surface.

Triton™ X-100 was used as the starting material compound. Triton™ X-100 was dissolved in distilled water in 1% (v/v) concentration, spread over glass with a spin coater, and fabricated a self-supporting thin membrane by plasma polymerization in the same manner as in Example 2. FIG. 7 shows (a) a light micrograph of the self-supporting polymer membrane (Triton™ X-100) fabricated by plasma irradiation, and (b) the chemical formula of Triton™ X-100.

A 1% aqueous solution of the starting material compound Triton™ X-100 was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 7). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the Triton™ X-100 polymer membrane was formed.

Example 4

Figure 8:
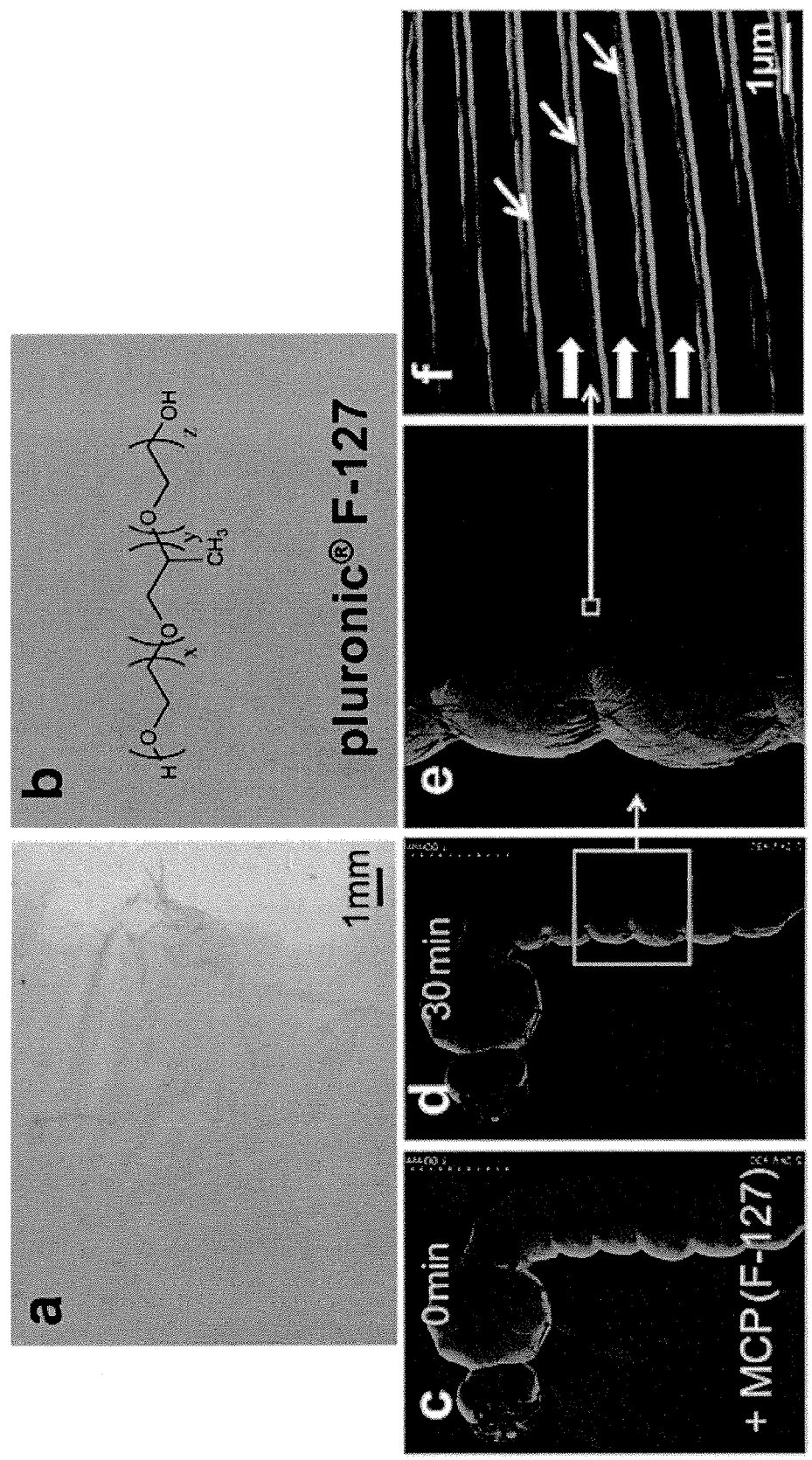
FIG. 8 shows photographic images of the polymer membrane of Example 4 and SEM video images of the polymer membrane on a sample surface.

Pluronic® F-127 was used as the starting material compound. Pluronic® F-127 was dissolved in distilled water in 1% (v/v) concentration, spread over glass with a spin coater, and fabricated a self-supporting thin membrane by plasma polymerization in the same manner as in Example 2. FIG. 8 shows (a) a light micrograph of the self-supporting polymer membrane (Pluronic® F-127) fabricated by plasma irradiation, and (b) the chemical formula of Pluronic® F-127.

A 1% aqueous solution of the starting material compound Pluronic® F-127 was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 8). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the Pluronic® F-127 polymer membrane was formed.

Example 5

Figure 9:
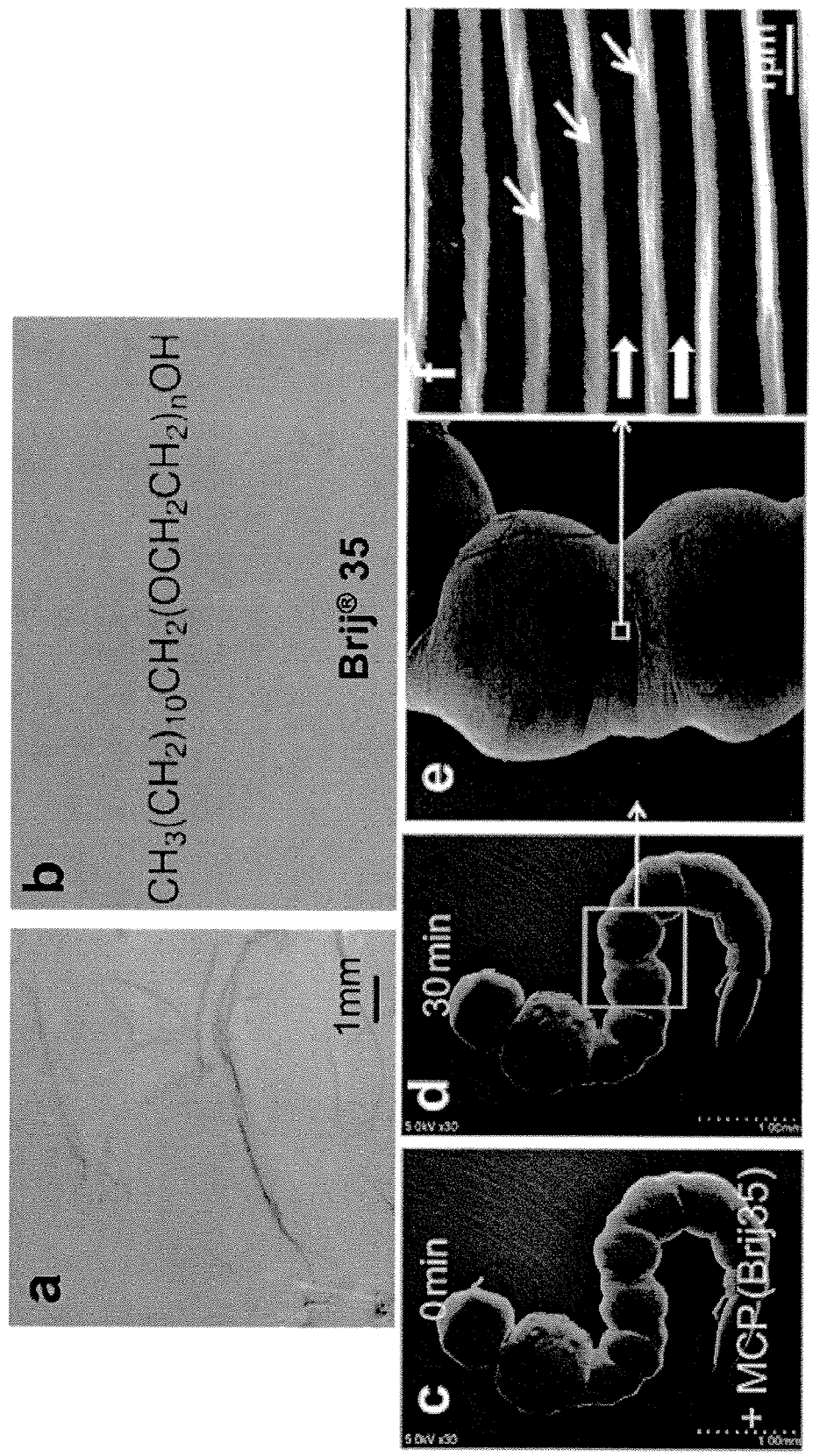
FIG. 9 shows photographic images of the polymer membrane of Example 5 and SEM video images of the polymer membrane on a sample surface.

Brij® 35 was used as the starting material compound. Brij® 35 was dissolved in distilled water in 1% (v/v) concentration, spread over glass with a spin coater, and fabricated a self-supporting thin membrane by plasma polymerization in the same manner as in Example 2. FIG. 9 shows (a) a light micrograph of the self-supporting polymer membrane (Brij® 35) fabricated by plasma irradiation, and (b) the chemical formula of Brij® 35.

A 1% aqueous solution of the starting material compound Brij® 35 was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 9). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the Brij® 35 polymer membrane was formed.

Example 6

Figure 10:
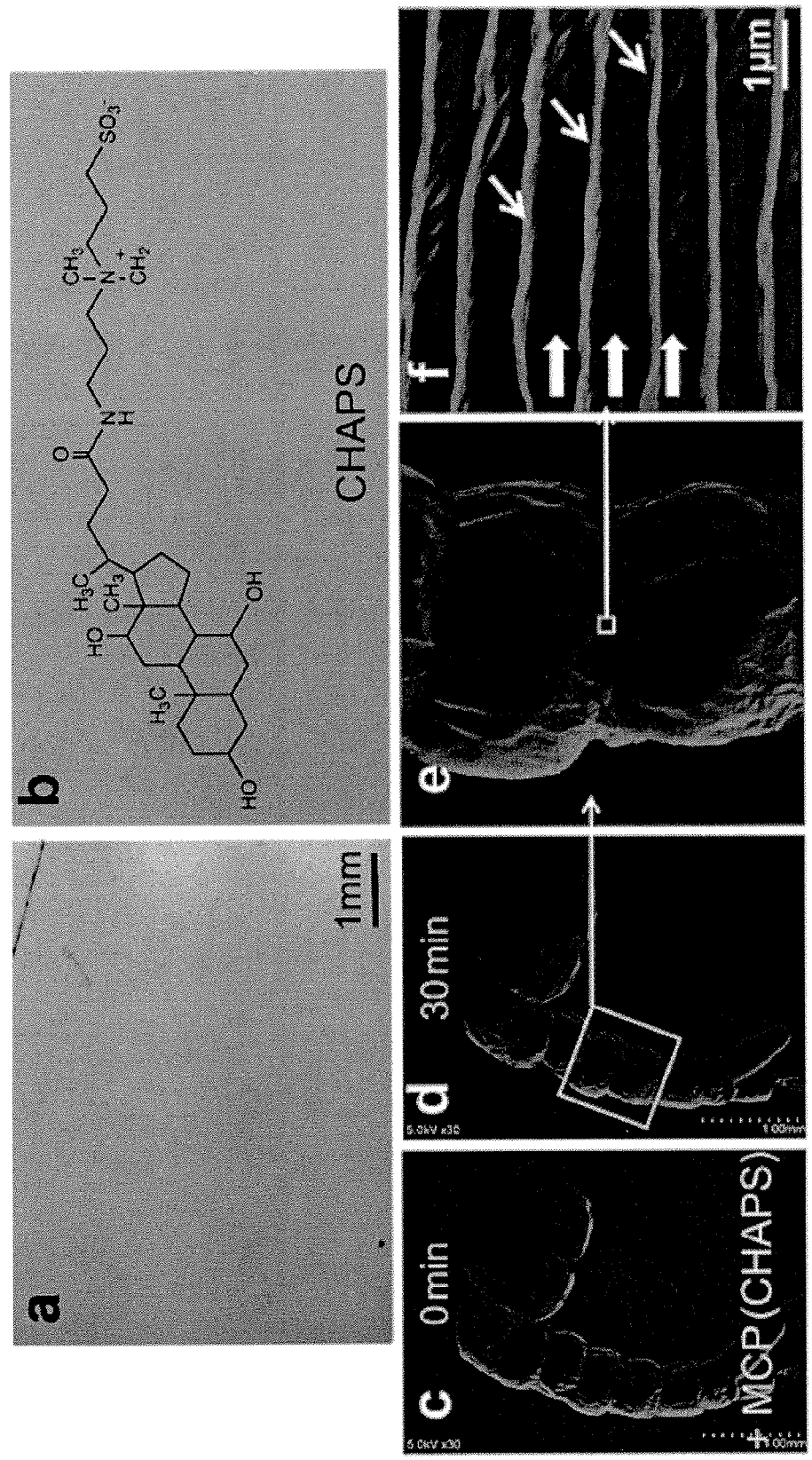
FIG. 10 shows photographic images of the polymer membrane of Example 6 and SEM video images of the polymer membrane on a sample surface.

CHAPS was used as the starting material compound. CHAPS was dissolved in distilled water in 1% (v/v) concentration, spread over glass with a spin coater, and fabricated a self-supporting thin membrane by plasma polymerization in the same manner as in Example 2. FIG. 10 shows (a) a light micrograph of the self-supporting polymer membrane (CHAPS) fabricated by plasma irradiation, and (b) the chemical formula of CHAPS.

A 1% aqueous solution of the amphiphatic compound CHAPS was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 10). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the CHAPS polymer membrane was formed.

Example 7

Figure 11:
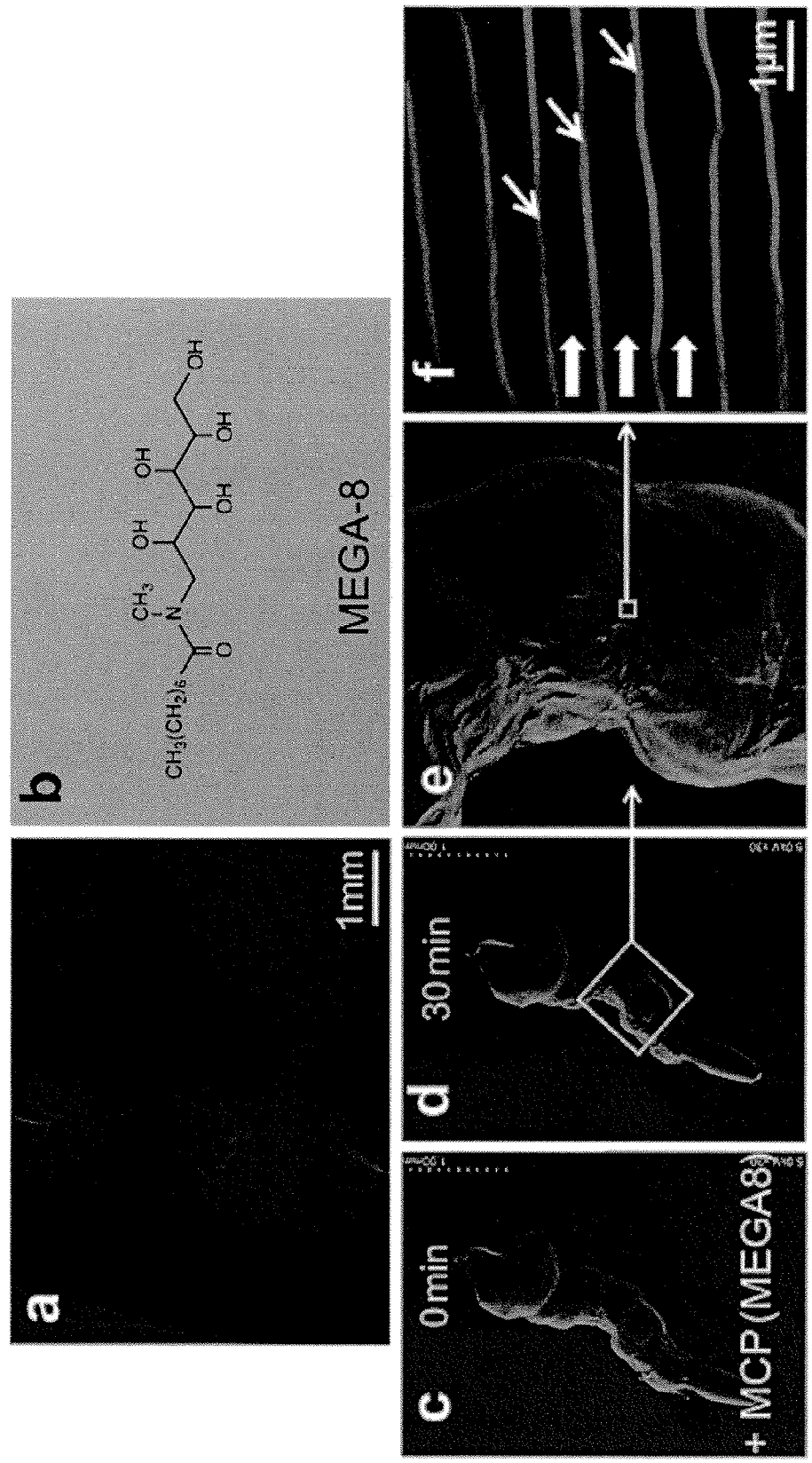
FIG. 11 shows photographic images of the polymer membrane of Example 7 and SEM video images of the polymer membrane on a sample surface.

MEGA8 was used as the starting material compound. MEGA8 was dissolved in distilled water in 1% (v/v) concentration, spread over glass with a spin coater, and fabricated a self-supporting thin membrane by plasma polymerization in the same manner as in Example 2. FIG. 11 shows (a) a light micrograph of the self-supporting polymer membrane (MEGA8) fabricated by plasma irradiation, and (b) the chemical formula of MEGA8.

A 1% aqueous solution of the starting material compound MEGA8 was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 11). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the MEGA8 polymer membrane was formed.

Example 8

Figure 12:
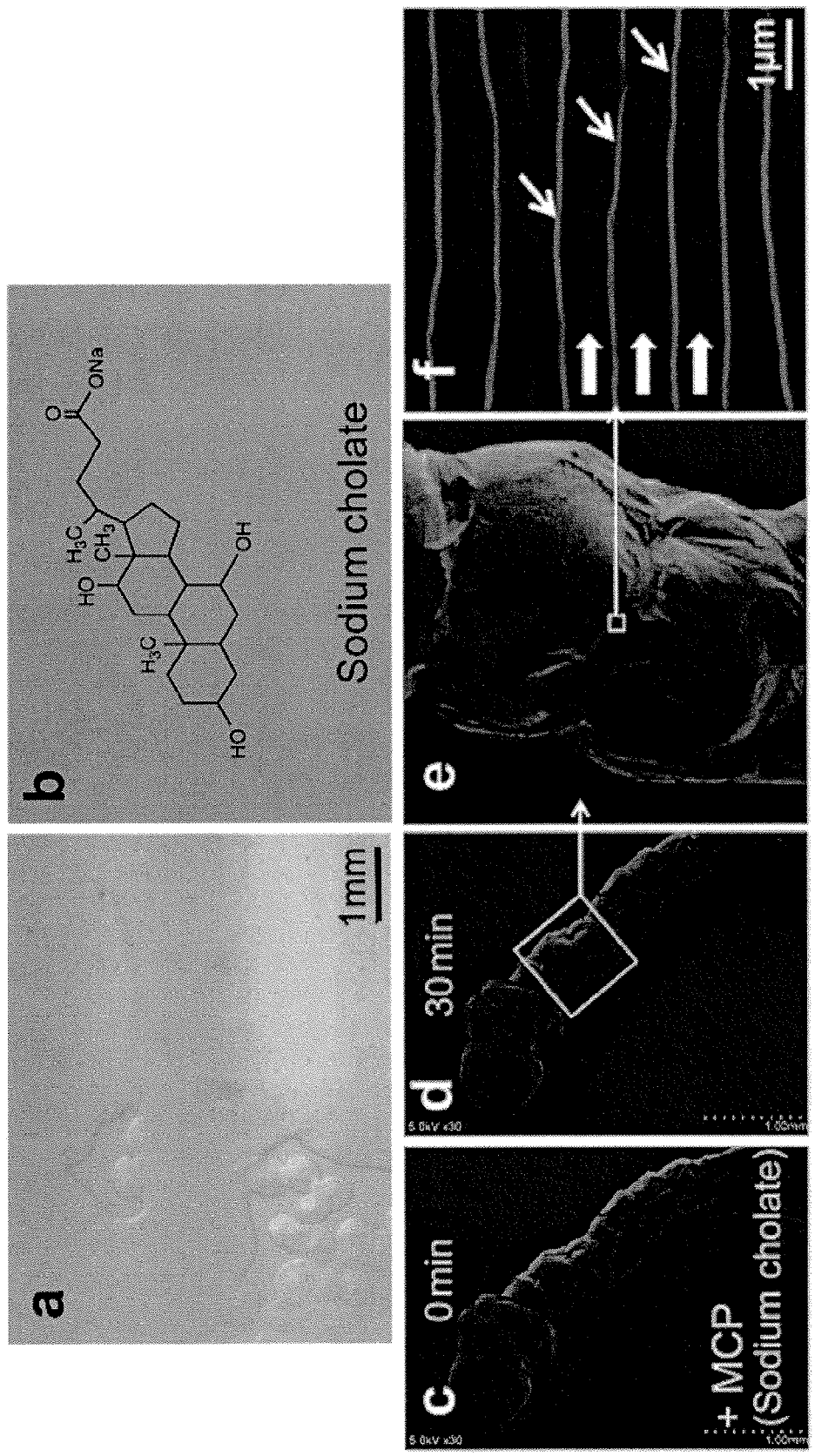
FIG. 12 shows photographic images of the polymer membrane of Example 8 and SEM video images of the polymer membrane on a sample surface.

Sodium cholate was used as the starting material compound. Sodium cholate was dissolved in distilled water in 1% (v/v) concentration, spread over glass with a spin coater, and fabricated a self-supporting thin membrane by plasma polymerization in the same manner as in Example 2. FIG. 12 shows (a) a light micrograph of the self-supporting polymer membrane (sodium cholate) fabricated by plasma irradiation, and (b) the chemical formula of sodium cholate.

A 1% aqueous solution of the starting material compound sodium cholate was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 12). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the sodium cholate polymer membrane was formed.

Example 9 n-Dodecyl-β-D-maltoside was used as the starting material compound. n-dodecyl-β-D-maltoside was dissolved in distilled water in 1% (v/v) concentration, spread over glass with a spin coater, and fabricated a self-supporting thin membrane by plasma polymerization in the same manner as in Example 2. FIG. 13 shows (a) a light micrograph of the self-supporting polymer membrane (n-dodecyl-β-D-maltoside) fabricated by plasma irradiation, and (b) the chemical formula of n-dodecyl-β-D-maltoside.

A 1% aqueous solution of the starting material compound n-dodecyl-β-D-maltoside was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 13). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the n-dodecyl-β-D-maltoside polymer membrane was formed.

Figure 14:
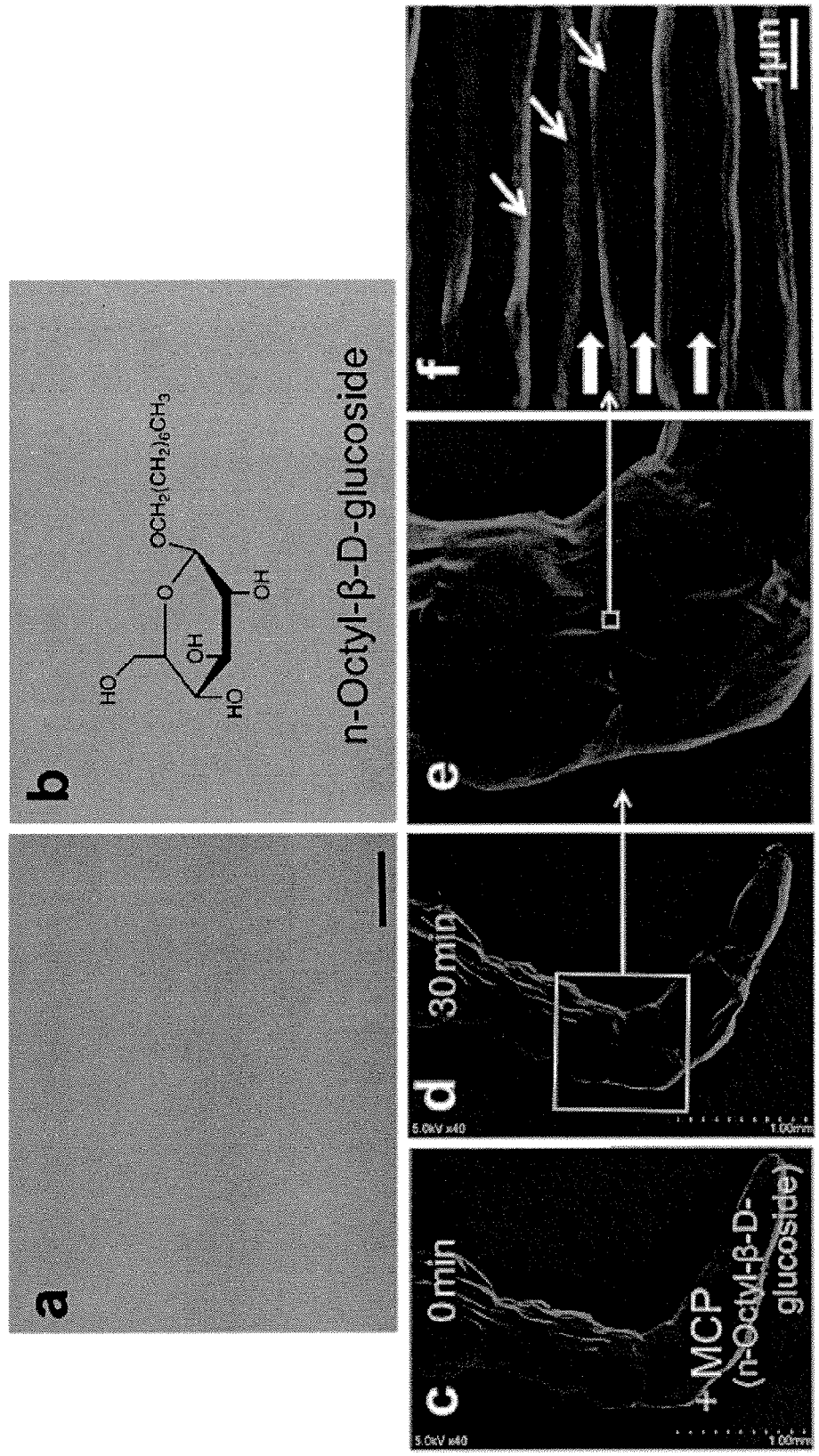
FIG. 14 shows photographic images of the polymer membrane of Example 10 and SEM video images of the polymer membrane on a sample surface.

Example 10 n-Octyl-β-D-glucoside was used as the starting material compound. n-octyl-β-D-glucoside was dissolved in distilled water in 1% (v/v) concentration, spread over glass with a spin coater, and fabricated a self-supporting thin membrane by plasma polymerization in the same manner as in Example 2. FIG. 14 shows (a) a light micrograph of the self-supporting polymer membrane (n-octyl-β-D-glucoside) fabricated by plasma irradiation, and (b) the chemical formula of n-octyl-β-D-glucoside.

A 1% aqueous solution of the starting material compound n-octyl-β-D-glucoside was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 14). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the n-octyl-β-D-glucoside polymer membrane was formed.

Example 11

Figure 15:
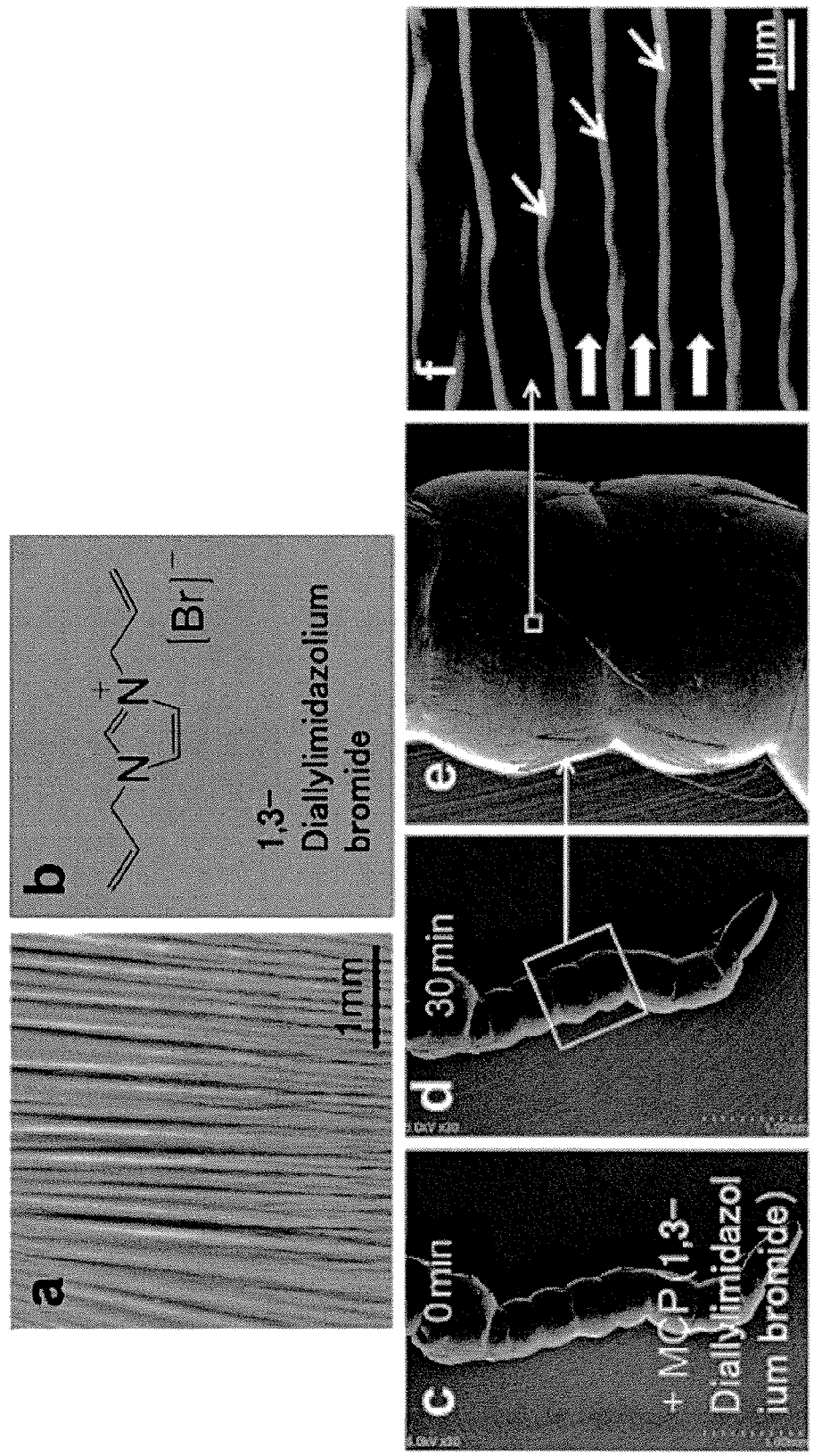
FIG. 15 shows photographic images of the polymer membrane of Example 11 and SEM video images of the polymer membrane on a sample surface.

1,3-Diallylimidazolium bromide was used as the starting material compound. 1,3-diallylimidazolium bromide was dissolved in distilled water in 1% (v/v) concentration, spread over glass with a spin coater, and fabricated a self-supporting thin membrane by plasma polymerization in the same manner as in Example 2. FIG. 15 shows (a) a light micrograph of the self-supporting polymer membrane (1,3-diallylimidazolium bromide) fabricated by plasma irradiation, and (b) the chemical formula of 1,3-diallylimidazolium bromide.

A 1% aqueous solution of the starting material compound 1,3-diallylimidazolium bromide was used to prepare an evaporation inhibiting composition.

A living mosquito larva was dipped in the evaporation inhibiting composition for 1 minute, and the body surface was covered with a thin membrane after taking the larva out of the solution and wiping the excess liquid.

The larva was then placed in a SEM sample chamber, and video images were taken (FIG. 15). The pictures c and d show the larva at time 0 and 30 (min), respectively, the picture e is an enlarged view of the box in d, and the picture f is a further enlarged view. The mosquito larva was seen to move even after the start of electron beam irradiation, suggesting that the thin membrane on the body surface was polymerized under the electron beam and the 1,3-diallylimidazolium bromide polymer membrane was formed.

Example 12

A self-supporting thin membrane was obtained by using 1,3-diallylimidazolium bromide as the starting material compound as in Example 11. The membrane was deposited under 40 mA, 20 to 30 min plasma polymerization conditions. FIG. 16 shows (a) a light micrograph of the plasma irradiated self-supporting polymer membrane, and (b) a light micrograph the polymer membrane being detached in ethanol. It was possible to detach the polymer membrane as a single sheet of membrane in ethanol. The polymer membrane instantaneously broke apart into small pieces upon being placed in water.

Figure 17:
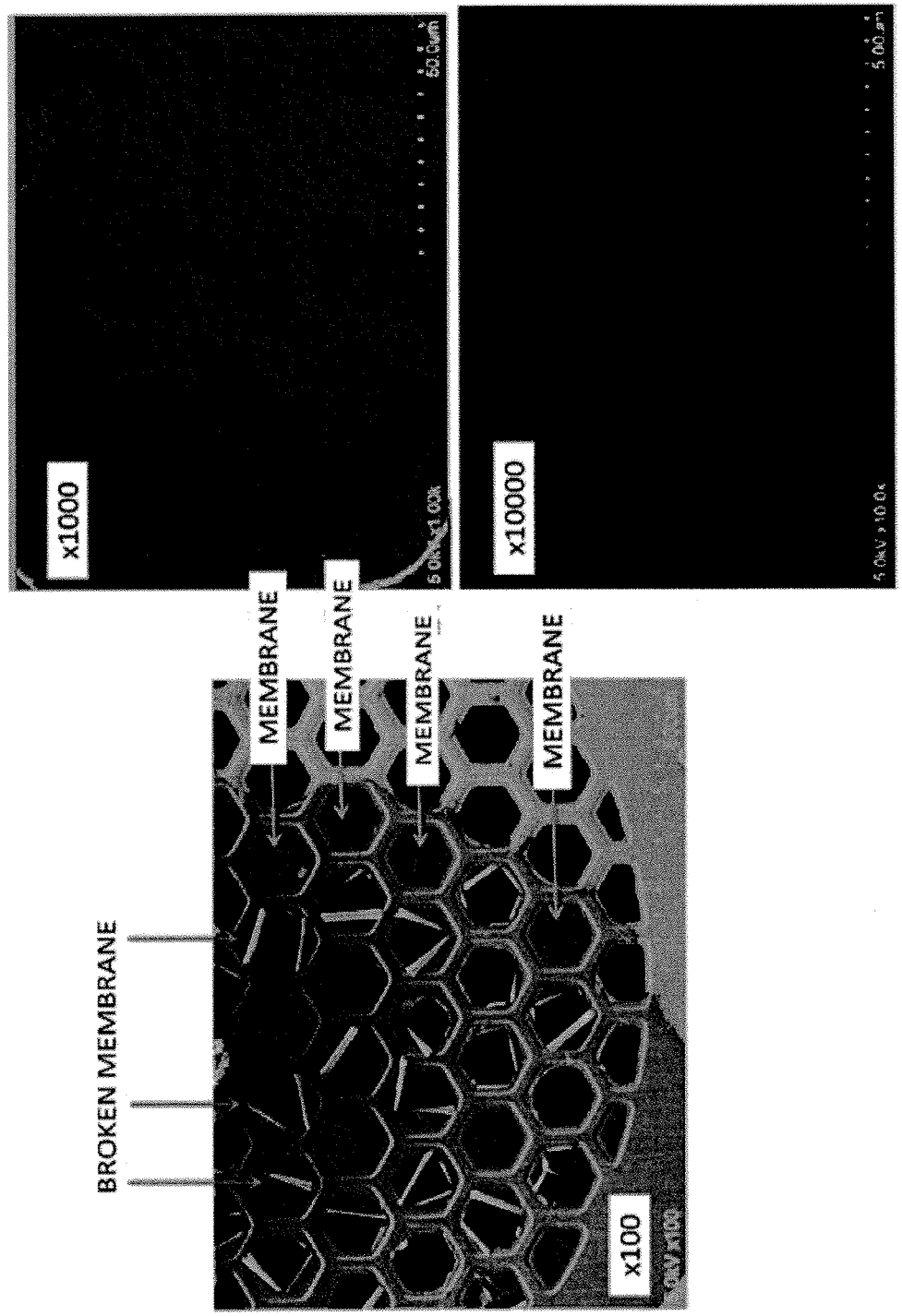
FIG. 17 shows SEM images of the membrane of Example 12 directly observed on a microgrid after being detached.
Figure 18:
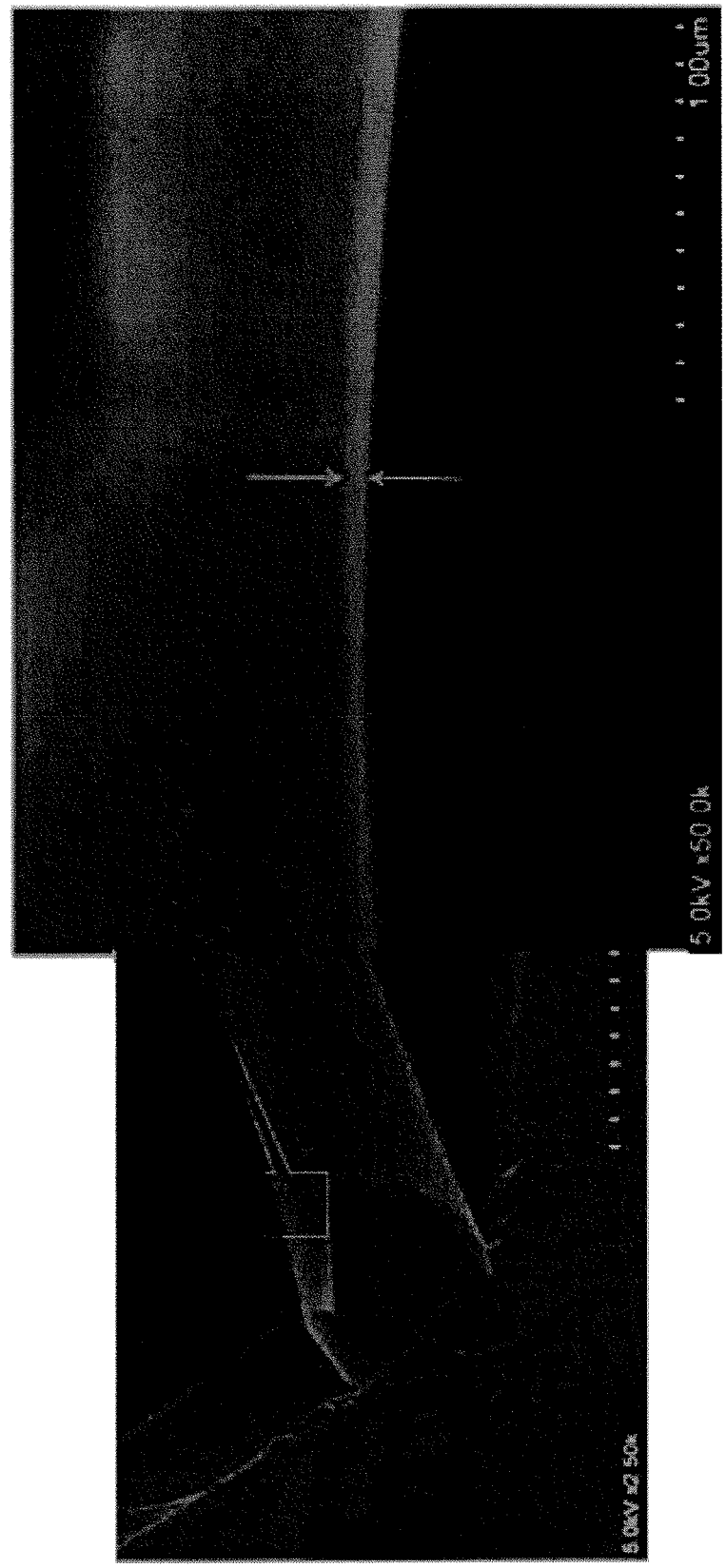
FIG. 18 shows SEM images of a cross section of the membrane shown in FIG. 17.

The detached membrane was placed on a microgrid, and observed under SEM (FIG. 17). Some of the membranes were broken, but membrane observation was possible at the intact portion. FIG. 18 is an observed SEM image of a membrane cross section. The membrane was about 50 nm thick, and the SEM observation did not involve phenomena such as charge-up, a phenomenon in which the membrane turns black under an electron beam. Unlike the Tween 20 membrane for which the heat damage due to the electron beam was unavoidable at high magnifications in SEM observation, the sample allowed for very desirable observations. Direct observation of the membrane was possible without a pretreatment. The conductivity was on the order of $10^4$ ohms in terms of a resistance value.

Figure 19:
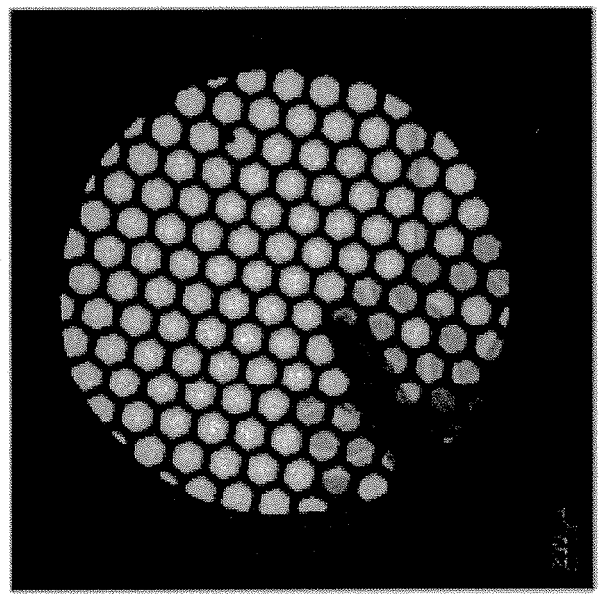
FIG. 19 is a TEM image of the polymer membrane of Example 12.
Figure 20:
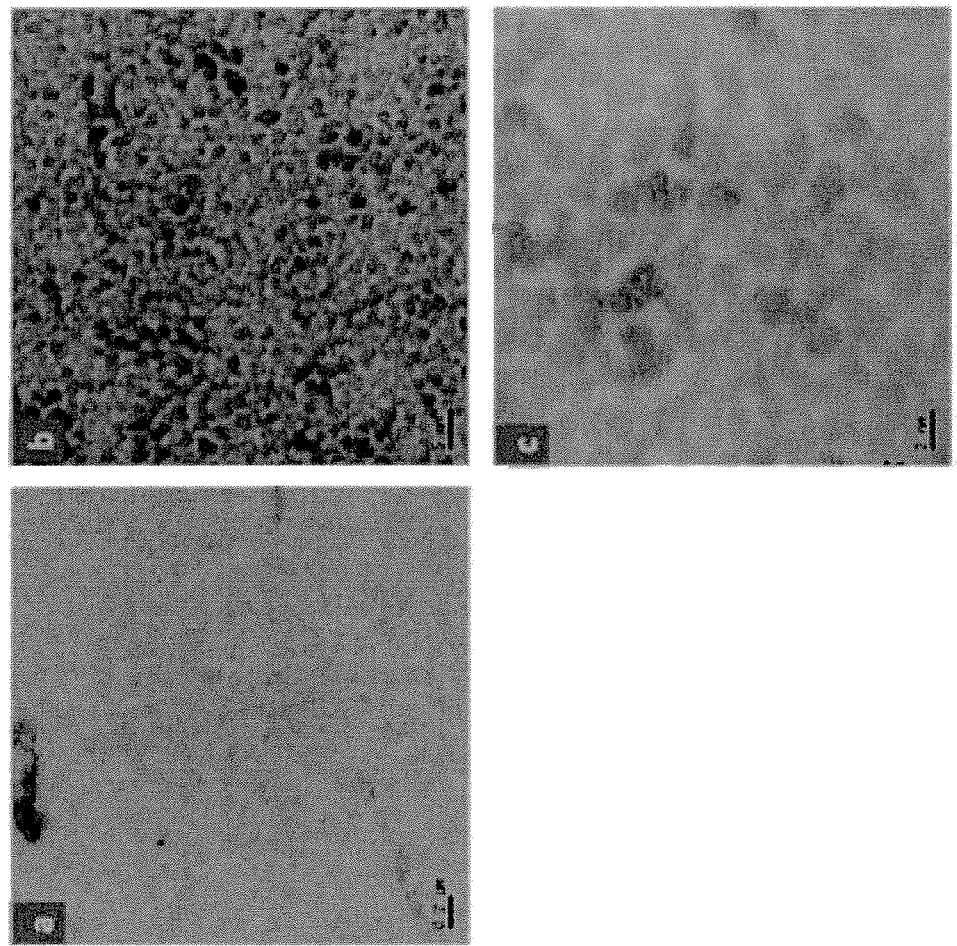
FIG. 20 shows TEM images magnifying the polymer membrane shown in FIG. 19.

FIG. 19 is an observed TEM image of the polymer membrane (acceleration voltage 80 kV), and FIG. 20 are observed TEM images at increasing magnifications ((a), (b), and (c)). Ring structures measuring about 2 nm in diameter were observed at higher magnifications. No beam damage was observed after the TEM observation, showing that the membrane was heat resistant. By comparing with the Tween 20 membrane that broke at high magnifications, it is indicated that the membrane was more resistance to heat than the Tween 20 membrane.

Example 13

Figure 21:
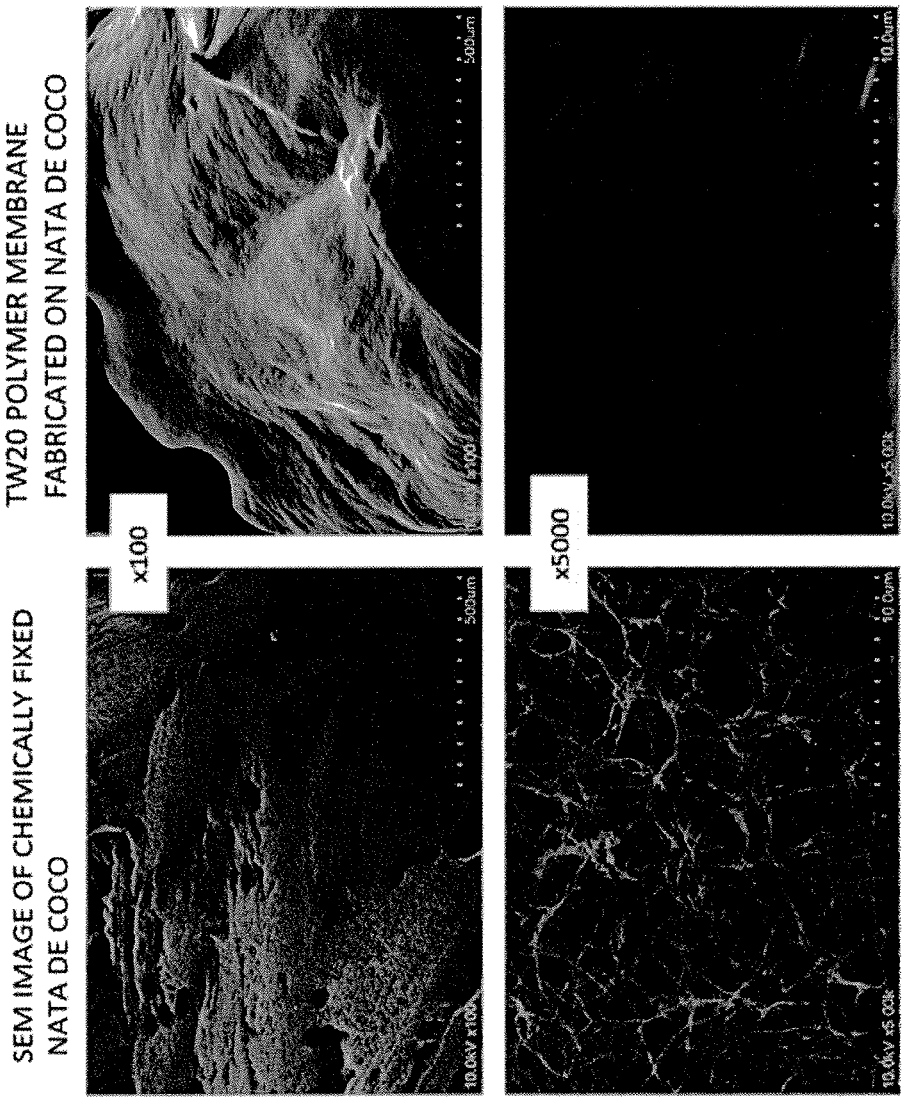
FIG. 21 shows SEM images of sample surfaces of Example 13.

Tween 20 was used as the starting material compound as in Example 2, and deposited on a natural cellulose gel having a fibrous surface (commercially available nata de coco). Plasma polymerization was performed under 30 mA, 10 min conditions. The membrane was observed under SEM (FIG. 21). A self-supporting Tween 20 membrane covering the fibrous surface of the cellulose gel was observed, and there was no weight change before and after the observation.

Example 14

Tween 20 was used as the starting material compound as in Example 2, and deposited on a synthetic acrylamide gel having a smooth surface. Plasma polymerization was performed under 30 mA, 10 min conditions. The membrane was observed under SEM. A self-supporting Tween 20 membrane covering the acrylamide gel surface was observed, and there was no weight change before and after the observation.

Example 15

Tween 20 was used as the starting material compound to obtain a self-supporting thin membrane as in Example 2. The material was deposited by using air as the plasma source, and plasma polymerization was performed under 30 mA, 10 min conditions.

Figure 22:
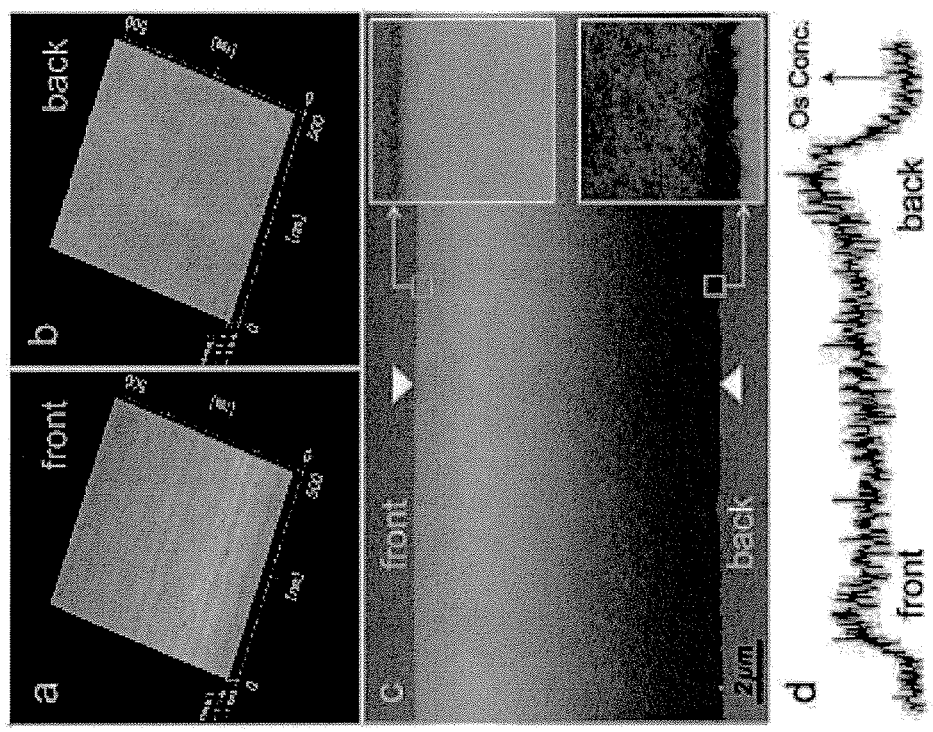
FIG. 22 represents the result of the atomic force microscope (AFM) observation of surface structures of the polymer membrane of Example 15, in which (a) is the irradiated surface, (b) is the non-irradiated surface, (c) shows the result of the cross sectional TEM observation of surface structures on the irradiated surface and the non-irradiated surface, and the inner structure of the membrane, and (d) represents the result of the energy dispersive X-ray (EDX) inner composition analysis of the membrane from the irradiated surface to the non-irradiated surface.

FIG. 22 shows the result of the atomic force microscopy (AFM) of the polymer membrane surface structures, in which (a) is the irradiated surface, (b) is the non-irradiated surface, (c) shows the result of the cross sectional TEM observation (see Example 1) of irradiated and non-irradiated surface structures and the inner membrane structure, and (d) shows the result of the energy dispersive X-ray (EDX) composition analysis of the inner membrane from the irradiated surface to the non-irradiated surface.

The AFM surface structure observation revealed that the irradiated surface was smooth, and the non-irradiated surface was rough. The cross sectional TEM observation of the surface structures and the inner membrane structure revealed that the extent of Os staining was small on the irradiated surface, and was large on the non-irradiated surface. The EDX composition analysis of the inner membrane from the irradiated surface to the non-irradiated surface also revealed that the Os concentration was low on the irradiated surface, and was high on the non-irradiated surface.

Example 16

Figure 23:
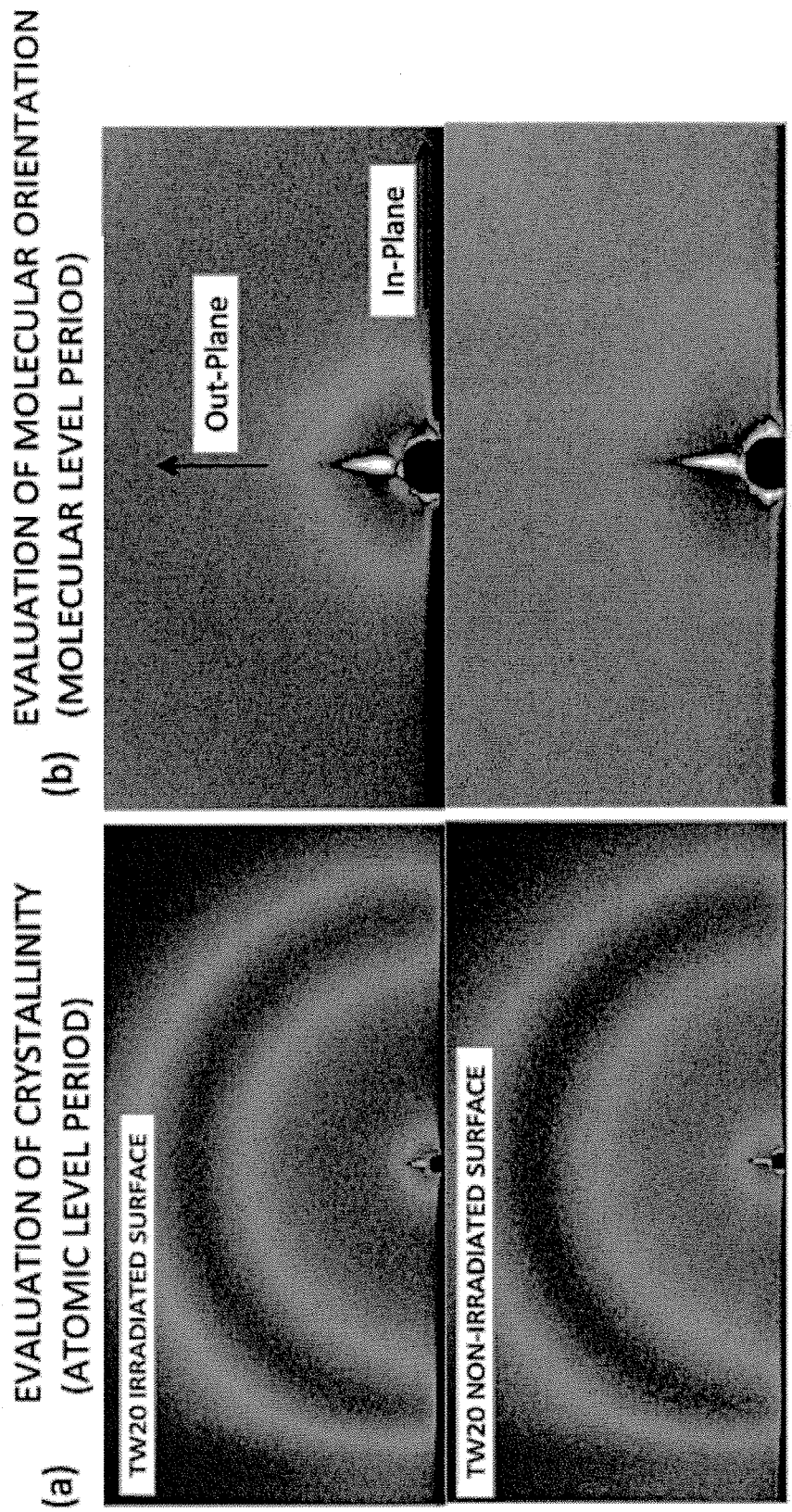
FIG. 23 shows the result of the GI-SAXS thin membrane orientation analysis of the polymer membrane of Example 16.

A Tween 20 polymer membrane was fabricated in the same manner as in Example 15, and subjected to a glazing-incidence small angle X-ray scattering (GI-SAXS) thin membrane orientation analysis. The results are shown in FIG. 23, in which (a) represents the evaluation of crystallinity (atomic level period), and (b) represents the evaluation of molecular orientation (molecular level period). The upper and lower pictures represent the irradiated and non-irradiated surfaces, respectively.

The orientation analysis was performed only for the outermost layer in directions out of the plane (perpendicular to the surface) and within the plane (parallel to the surface). It was indicated that the membrane was an amorphous membrane with the irradiated surface having higher orientation than the non-irradiated surface in terms of a molecular level period.

Example 17

Comparison was made for air and nitrogen plasma sources. A Tween 20 polymer membrane was fabricated in the same manner as in Example 15, except that air or nitrogen was used as the plasma source.

Figure 24:
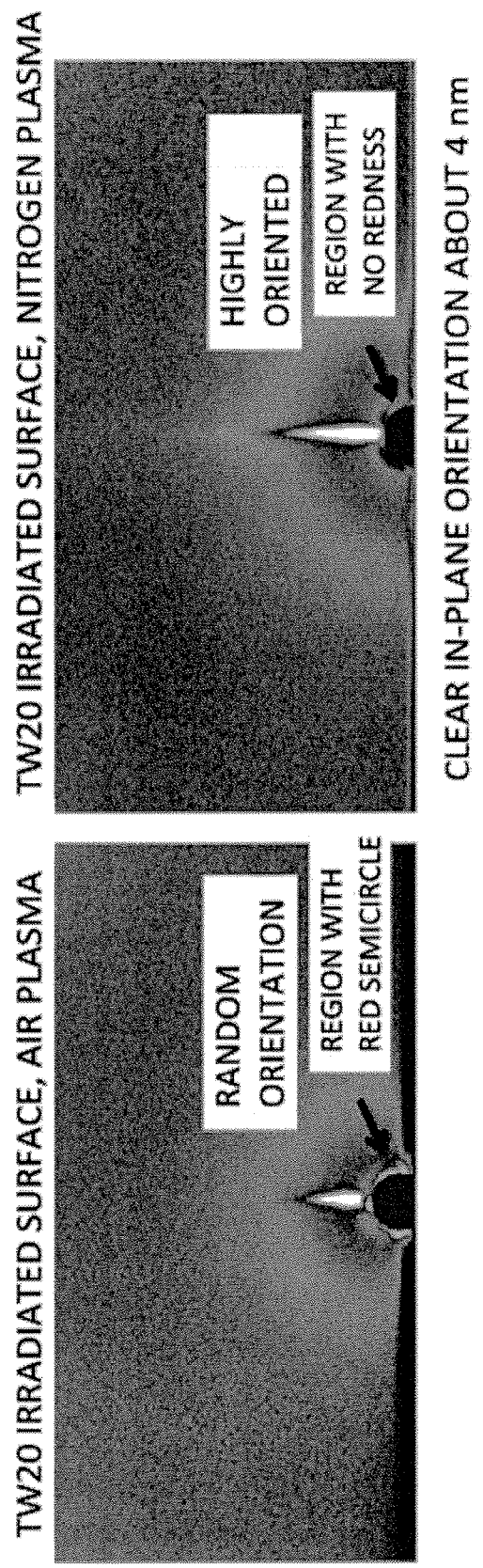
FIG. 24 shows the results of the GI-SAXS thin membrane orientational analyses of the thin membranes fabricated with an air plasma and a nitrogen plasma in Example 17.

A GI-SAXS thin membrane orientation analysis was performed. The results are shown in FIG. 24. The membrane was randomly oriented when the air plasma was used (left in the figure), whereas the membrane subjected to the nitrogen plasma (right in the figure) was highly orientated with clear in-plane orientation about 4 nm.

Figure 25:
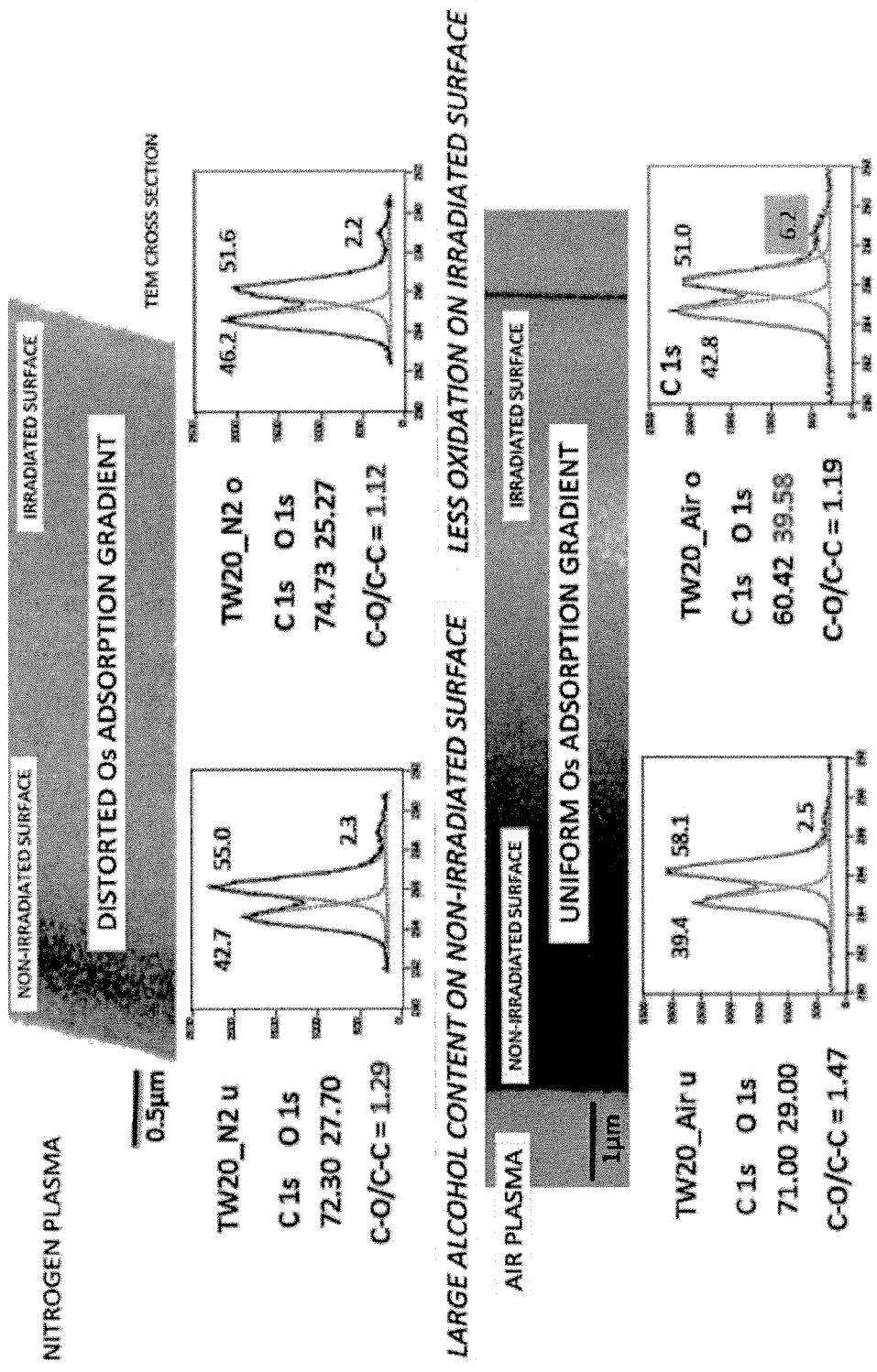
FIG. 25 shows the results of the XPS surface composition analyses of the thin membranes fabricated with an air plasma and a nitrogen plasma in Example 17, and the cross sectional TEM images of the thin membranes.

FIG. 25 represents the results of the XPS surface composition analysis of the polymer membranes along with the results of cross sectional TEM (see Example 1). A clear difference was confirmed in the structures of the irradiated surface and the non-irradiated surface in the both membranes subjected to the air plasma and the nitrogen plasma. The membrane subjected to the air plasma had uniform Os adsorption gradient (lower picture in the figure), whereas the Os adsorption gradient was distorted in the membrane subjected to the nitrogen plasma (upper picture in the figure).

It was confirmed that a membrane structure different from that obtained with Tween 20 in air can be obtained by changing the plasma source to nitrogen.

The surface tension was 33.9 N/m for the irradiated surface, and 30.8 N/m for the non-irradiated surface as measured by Kaelble-Uy approximation, suggesting that the polar group difference between the irradiated surface and the non-irradiated surface was small. This is because of the reduced oxidation of the irradiated surface as a result of using nitrogen as the plasma source.

Example 18

The constituent components of Tween 20 that produced the desirable membranes in the foregoing examples were extracted, and searched for functional groups that were involved in the polymerization. Span 20, lauric acid, and poly(ethylene oxide) (PEG: average molecular weight My 300,000) irradiated under the same conditions as for Tween 20 (plasma source: air, irradiation intensity: 30 mA, irradiation time: 10 min) tended to produce desirable polymerizable membranes in samples that had a PEG chain or a plurality of OH groups, and incomplete polymerizable membranes in samples that had a single OH group. On the assumption that a desirable membrane can be obtained even with a single OH group under more severe irradiation conditions, deposition experiments were conducted with 41 different compounds that satisfied the following conditions. The membranes were deposited under the irradiation intensity of 30 mA and the irradiation time of 10 min irradiation conditions using an air plasma source.

(A) Compound groups having no polymerization active group
  (1) Compound group having polyethylene glycol (PEG chain) within the molecule (such as Pluronic® F-127)
  (2) Compound group having a plurality of hydroxyl or carboxyl groups (such as n-dodecyl-β-D-maltoside)
  (3) Compound group having a single hydroxyl or carboxyl group (such as lauric acid)
(B) Compound group having a polymerization active group
  (4) Compound group having a carbon-carbon double bond (alkenes), a carbon-nitrogen double bond (Schiff bases), or a carbon-oxygen double bond (keto groups)

It was investigated whether these compounds, 6 or more compounds in each group (a total of 41 compounds), were able to form a self-supporting organic thin membrane in plasma polymerization.

The results are presented in Table 1.

ditions. Biocompatible molecules with a PEG chain or a double bond were found to be capable of producing a membrane, and membranes were produced also from molecules that did not have such groups, provided that more than one hydroxyl or carboxyl group was present. It was possible to polymerize and fabricate an insoluble self-supporting membrane through plasma irradiation of liquid membranes of soluble small molecules (soluble in water, ethanol, or hexane), irrespective of the presence or absence of polymerizable functional groups such as vinyl, cyclic ether, carboxylic acid-amine, and carboxylic acid-alcohol.

An investigation into the membrane forming mechanism, and an analysis of a membrane structure were performed. Comparison was made for Tween 20 and PEG (average molecular weight My 300,000) that produced desirable membranes. The membranes were deposited under the irradiation intensity of 30 mA and the irradiation time of 10 min

TABLE 1

| Sample | Bicompatible chemicals | Polymerization site | Membrane state* | Solubility In water | In ethanol | In hexane |
|---|---|---|---|---|---|---|
| 1 | Tween 20 | PEG chain | ◉ | Good | Good | Turbid |
| 2 | Tween 40 | PEG chain | ◉ | Good | Good | Turbid |
| 3 | Tween 60 | PEG chain | ◉ | Good | Good | Turbid |
| 4 | Tween 80 | PEG chain | ◉ | Good | Good | Turbid |
| 5 | Brij 35 | PEG chain | ◉ | Good | Good | Poor |
| 6 | Triton X-100 | PEG chain | ◉ | Good | Good | Poor |
| 7 | Poly(ehylene oxide) | PEG chain | ◉ | Good | Poor | Poor |
| 8 | Pluronic F-127 | PEG chain | ◉ | Good | Poor | Poor |
| 9 | Pluronic F-68 | PEG chain | ◉ | Good | Poor | Poor |
| 10 | Lecithin (from Soy bean) | Multi OH | ◉ | Turbid | Good | Good |
| 11 | Tannic acid | Multi OH | ◉ | Poor | Good | Good |
| 12 | Tetraehoxysilane | Multi OH | ◉ | Good | Good | Good |
| 13 | Span 20 | Multi OH | ◉ | Turbid | Good | Turbid |
| 14 | D-maltose | Multi OH | ◉ | Good | Poor | Poor |
| 15 | Trehalose C12 | Multi OH | ◉ | Good | Good | Poor |
| 16 | D-glucose | Multi OH | ◉ | Good | Poor | Poor |
| 17 | n-Dodecyl-β-D-maltoside | Multi OH | ◉ | Good | Good | Poor |
| 18 | MEGA-8 | Multi OH | ○ | Good | Good | Poor |
| 19 | CHAPS | Multi OH | ○ | Good | Poor | Poor |
| 20 | D-trehalose | Multi OH | ○ | Good | Poor | Poor |
| 21 | Sodium cholate | Multi OH | ○ | Good | Good | Poor |
| 22 | n-Octyl-β-D-glucoside | Multi OH | ○ | Good | Good | Poor |
| 23 | Inulin | Multi OH | Δ | Turbid | Poor | Poor |
| 24 | Pullulan | Multi OH | Δ | Good | Poor | Poor |
| 25 | D-sorbitol | Multi OH | Δ | Good | Poor | Poor |
| 26 | L-tyrosine | Multi OH | Δ | Poor | Poor | Poor |
| 27 | L-glutamic acid | Multi OH | Δ | Poor | Poor | Poor |
| 28 | L-Aspartic Acid | Multi OH | Δ | Poor | Poor | Poor |
| 29 | Lauric Acid | Mono OH | ○ | Poor | Good | Good |
| 30 | Stearic acid n-dodecyl ester | Mono OH | ○ | Poor | Good | Good |
| 31 | behenic acid | Mono OH | ○ | Poor | Good | Poor |
| 32 | L-proline | Mono OH | Δ | Good | Poor | Poor |
| 33 | L-lysine | Mono OH | Δ | Good | Poor | Poor |
| 34 | L-histidine | Mono OH | Δ | Poor | Poor | Poor |
| 35 | Linolenic acid | OH & C=C Dougle bond | ◉ | Poor | Good | Good |
| 36 | Linoleic acid | OH & C=C Dougle bond | ◉ | Poor | Good | Good |
| 37 | Oleic acid | OH & C=C Dougle bond | ◉ | Poor | Good | Good |
| 38 | Erucic acid | OH & C=C Dougle bond | ◉ | Poor | Good | Good |
| 39 | Methacroylcholine Chloride | OH & C=C Dougle bond | ◉ | Good | Good | Poor |
| 40 | L-glutamine | OH & C=O Dougle bond | ○ | Good | Poor | Poor |
| 41 | L-Arginine | OH & C=N Dougle bond | ○ | Good | Poor | Poor |

Figure 26:
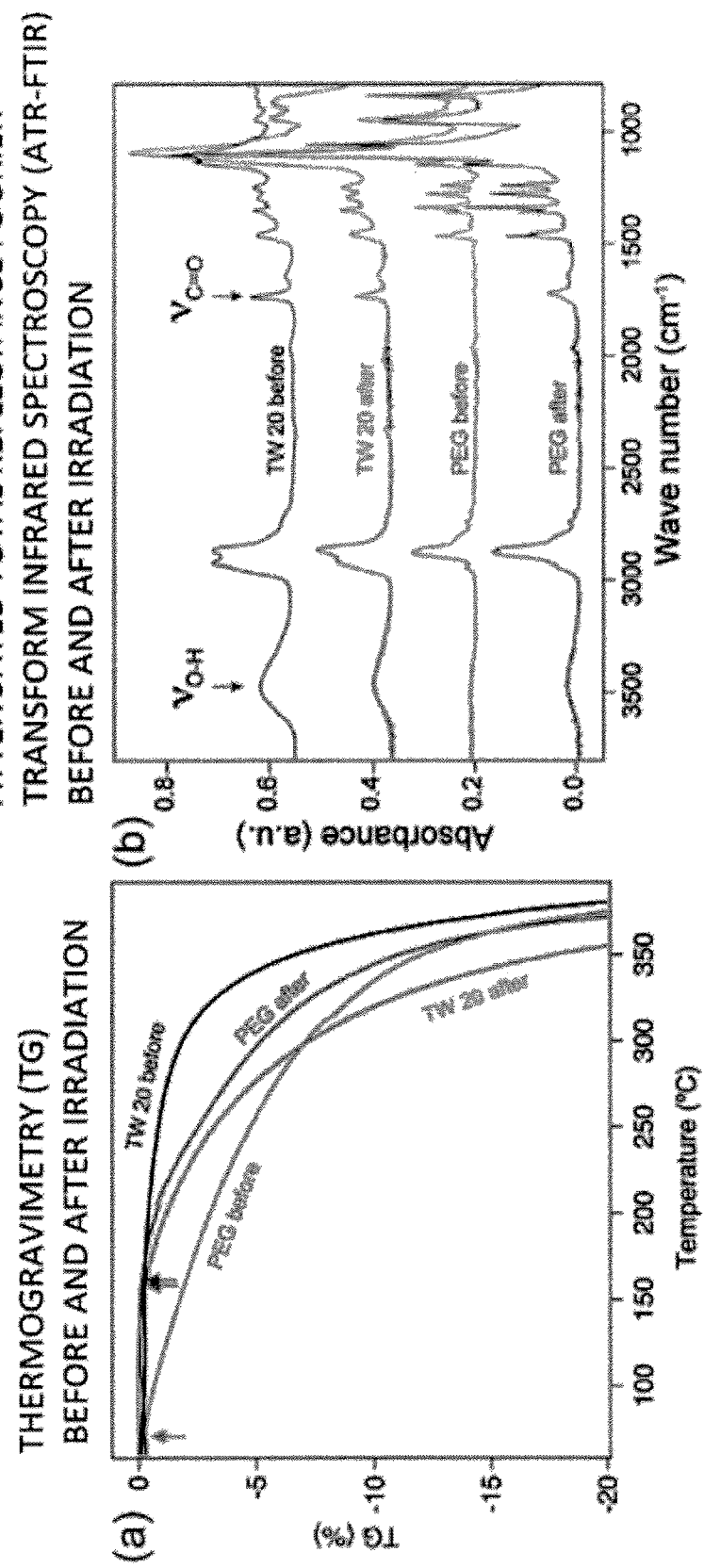
FIG. 26 shows the result of the thermogravimetry (TG) of Tween 20 and PEG liquid membranes of Example 18 before and after plasma irradiation, and the result of the attenuated total reflectance Fourier transform infrared spectroscopy (ATR-FTIR) before and after irradiation.

*◉: Large area stable thick membrane, ○: Small area stabele thin membrane, Δ: Unstable membrane Desirable membranes were obtained with compound groups (1) and (4). The membranes produced with the compound group (2) were generally desirable. The compound group (3) produced desirable membranes with conditions using an air plasma source. FIG. 26 shows the result of thermogravimetry (TG) before and after irradiation, and the result of attenuated total reflectance Fourier transform infrared spectroscopy (ATR-FTIR) before and after irradiation.

The results indicate that the plasma irradiation changed the molecular structure (OH polycondensation), and decomposed and polymerized the PEG chain.

Example 19

Figure 27:
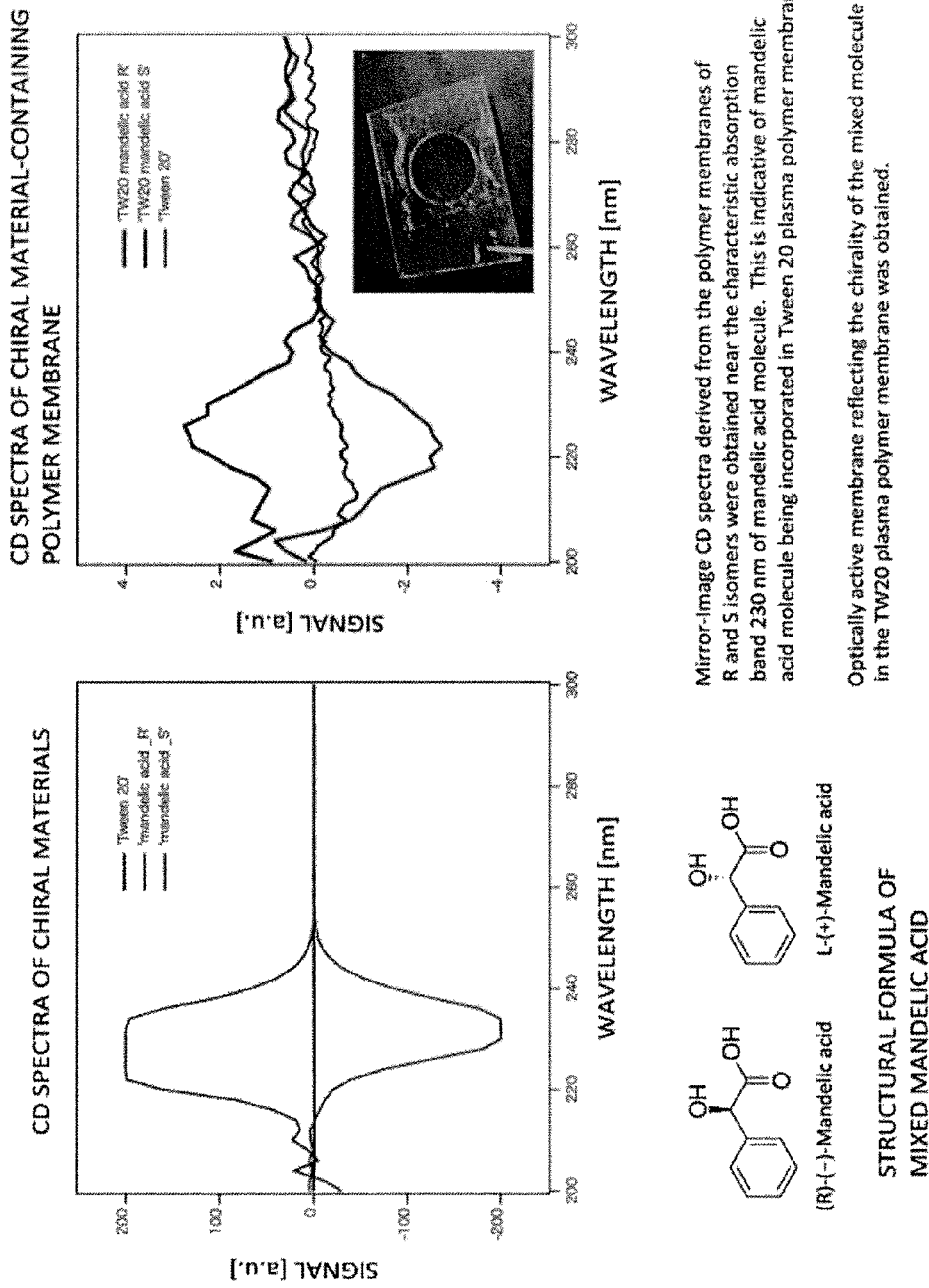
FIG. 27 represents the CD spectra of the chiral materials used in Example 19 (left), and the CD spectra of chiral material-containing polymer membranes (right).

Tween 20 that produced desirable membranes in the foregoing examples was used with 1.0 wt % of two forms of chiral material mandelic acid ((R)-(–)-mandelic acid and L-(+)-mandelic acid), and deposited by being irradiated at the irradiation intensity of 30 mA for the irradiation time of 10 minutes using an air plasma source. As shown in FIG. 27, membranes with the CD activity derived from the combined chiral materials were obtained.

Example 20

In this example, polymer membranes were fabricated by using Tween 40, Tween 60, and Tween 80 as the starting materials, instead of using Tween 20 (plasma source: air, irradiation intensity: 30 mA, irradiation time: 10 min). The polymer membranes were examined for the properties of the irradiated surface and the non-irradiated surface.

Figure 28:
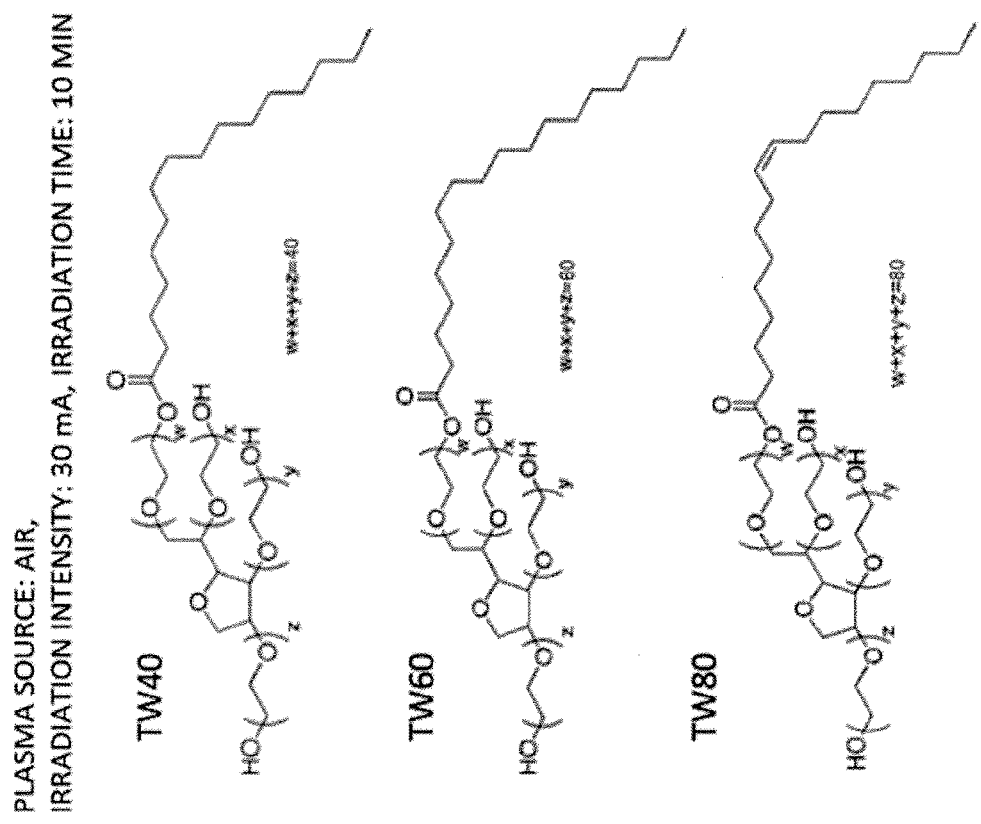
FIG. 28 represents the results of the contact angle measurements performed for the irradiated surface and the non-irradiated surface of the polymer membranes fabricated from the starting materials Tween 40, Tween 60, and Tween 80 in Example 20.
Figure 29:
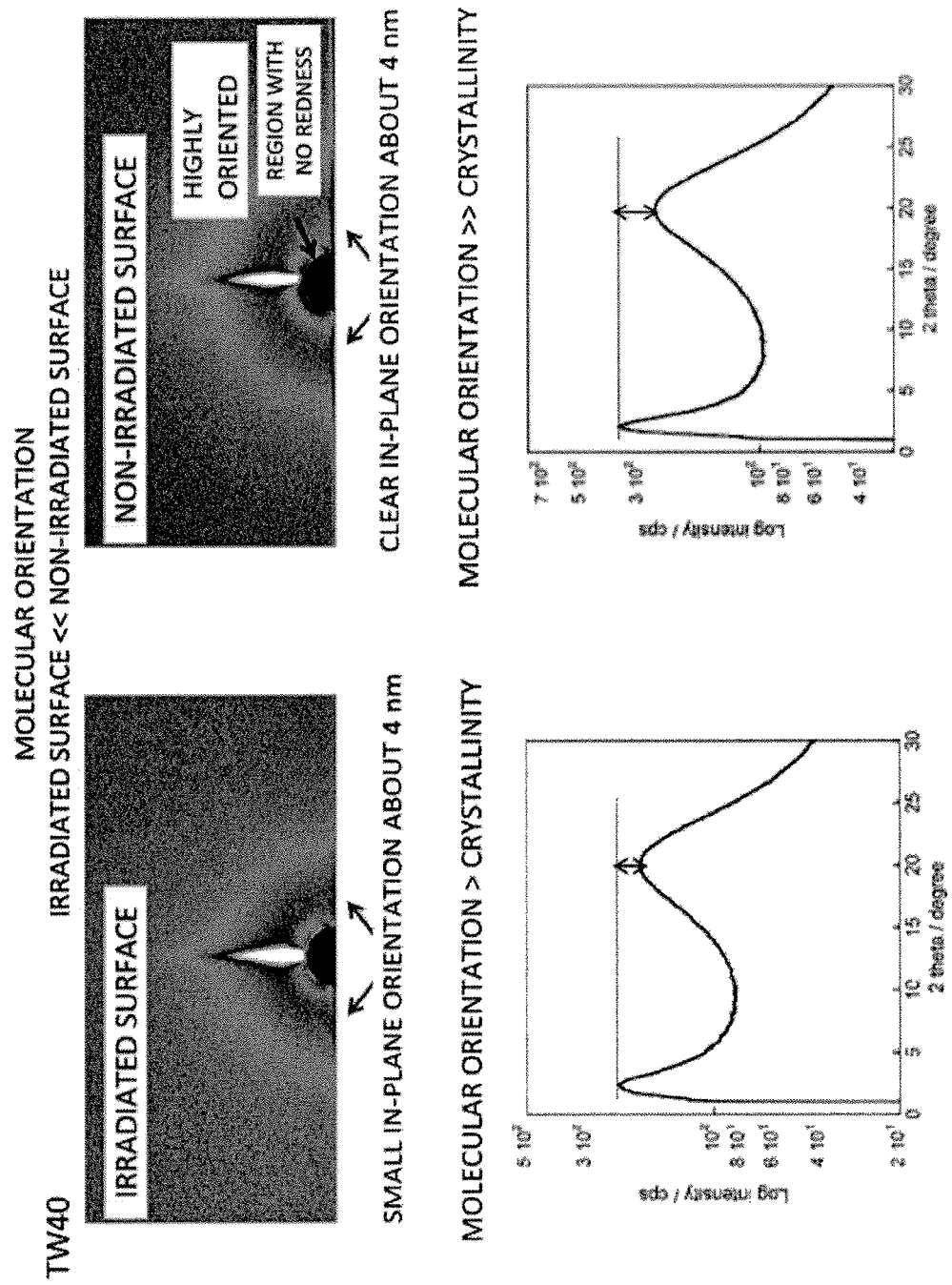
FIG. 29 represents the result of the GI-SAXS thin membrane orientation analysis of the polymer membrane of Example 20 (starting material: Tween 40).
Figure 31:
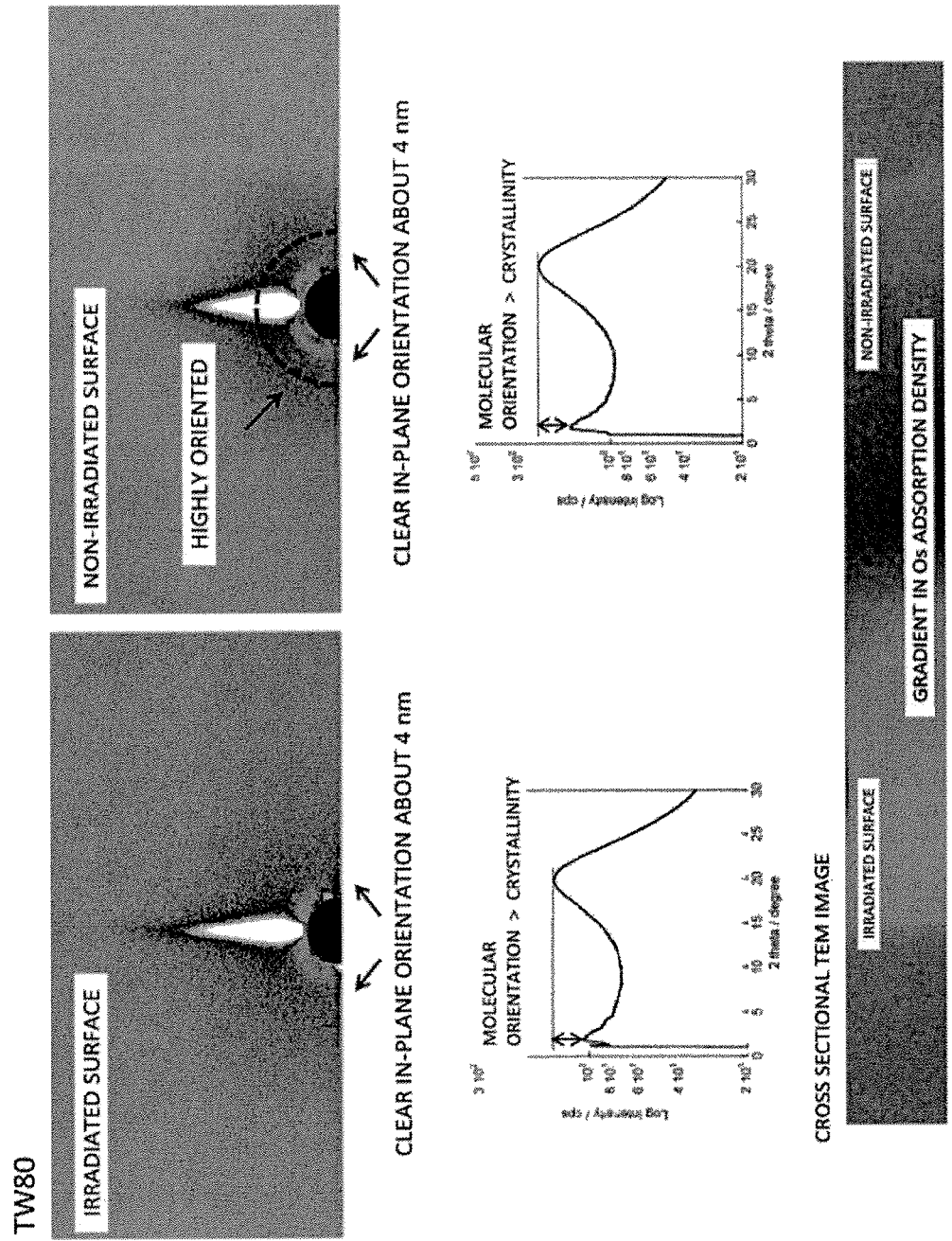
FIG. 31 shows the result of the GI-SAXS thin membrane orientation analysis of the polymer membrane of Example 20 (starting material: Tween 80), and the cross sectional TEM image of the polymer membrane.

Contact angle and surface tension measurements revealed that the plasma polymerization of Tween 40, Tween 60, and Tween 80 produced a physical property difference on the front and back of the membrane (FIG. 28) as with the case of Tween 20. A physical property difference on the front and back of the membrane was also observed in Tween 40, Tween 60, and Tween 80 after GI-SAXS thin membrane orientational analyses and the measurement and observation of cross sectional TEM images (Os adsorption) of the polymer membranes (FIGS. 29 to 31). It was also confirmed from the Os adsorption density gradient that the membranes had a gradually polymerized composition along the cross sectional direction of the thin membrane.

The invention claimed is:

1. A method for producing an organic polymer thin membrane,
the method comprising the steps of:
preparing a solution by dissolving at least one compound selected from the group consisting of (1) a compound having a hydrophilic functional group, (2) a compound having a polyalkylene glycol chain, and (3) a compound having a functional group selected from the group consisting of a hydroxyl group and a carboxyl group, in a solvent selected from the group consisting of (i) water, (ii) ethanol, and (iii) a mixture of water and ethanol, to obtain the solution;
coating the solution on a base material surface; and
forming an organic polymer thin membrane on the base material surface through a polymerization reaction caused by irradiating a surface of the coated solution with a plasma or an electron beam, the organic polymer thin membrane having a composition that is gradually polymerized from a thin membrane surface into the membrane in a cross sectional direction of the membrane.

2. The method for producing the organic polymer thin membrane according to claim 1, further comprising a step of forming a self-supporting membrane by detaching the organic polymer thin membrane from the base material surface.

3. The method for producing the organic polymer thin membrane according to claim 1, wherein the gradually polymerized composition is confirmed by using at least one technique selected from the group consisting of:
a transmission electron microscopy of a cross section across the thin membrane from the irradiated surface to the non-irradiated surface after an osmium staining of the thin membrane;
an energy dispersive X-ray inner composition analysis of the thin membrane from the irradiated surface to the non-irradiated surface;
an atomic force microscopy of surface structures on both the irradiated and non-irradiated surfaces of the thin membrane; and
a glazing-incidence small angle X-ray scattering orientation analysis of both the irradiated and non-irradiated surfaces of the thin membrane.

4. The method for producing the organic polymer thin membrane according to claim 2, wherein the self-supporting membrane has different structures on a front and a back of the self-supporting membrane, and is similar in structure to a cuticle of a living organism.

5. The method for producing the organic polymer thin membrane according to claim 4, wherein the self-supporting membrane has a plasma or electron beam irradiated surface having large numbers of polar groups and being easily wettable with water, and a non-irradiated surface having small numbers of polar groups and being less wettable with water.

6. The method for producing the organic polymer thin membrane according to claim 1, wherein the polymerization reaction caused by irradiating the surface of the coated solution with the plasma is performed with an ion sputtering device.

7. The method for producing the organic polymer thin membrane according to claim 1, wherein the polymerization reaction caused by irradiating the surface of the coated solution with the electron beam is performed at an intensity of an electron beam from a scanning electron microscope.

8. The method for producing the organic polymer thin membrane according to claim 1, wherein the polymerization reaction caused by irradiating the surface of the coated solution with the electron beam is performed inside an electron microscope device.

* * * * *